US008922895B1

(12) United States Patent
Weber

(10) Patent No.: US 8,922,895 B1
(45) Date of Patent: Dec. 30, 2014

(54) OPTICAL BODY WITH FRESNEL-RENDERING OF COMPLEX TOPOGRAPHICAL SURFACE

(71) Applicant: 3M Innovative Properties Company, St. Paul, MN (US)

(72) Inventor: Michael F. Weber, Shoreview, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/935,219

(22) Filed: Jul. 3, 2013

(51) Int. Cl.
*G02B 27/10* (2006.01)

(52) U.S. Cl.
USPC .......................................... 359/625; 359/627

(58) Field of Classification Search
USPC ................................................. 359/620–630
See application file for complete search history.

(56) References Cited

U.S. PATENT DOCUMENTS

| | | |
|---|---|---|
| 3,908,056 A | 9/1975 | Anderson |
| 4,108,540 A | 8/1978 | Anderson |
| 4,409,276 A | 10/1983 | Martinelli |
| 4,800,868 A | 1/1989 | Appeldorn |
| 4,848,319 A | 7/1989 | Appeldorn |
| 5,446,594 A | 8/1995 | Nelson |
| 5,551,042 A | 8/1996 | Lea |
| 5,566,023 A | 10/1996 | Kley |
| 5,631,057 A | 5/1997 | Sundet |
| 5,840,407 A | 11/1998 | Futhey |
| 6,075,200 A | 6/2000 | O'Neill |
| 6,092,772 A | 7/2000 | Garcia |
| 6,151,163 A | 11/2000 | Hall |
| 6,288,842 B1 | 9/2001 | Florczak |
| 6,399,874 B1 | 6/2002 | Olah |
| 6,474,839 B1 | 11/2002 | Hutchison |
| 6,531,230 B1 | 3/2003 | Weber |
| 6,700,712 B2 | 3/2004 | Servatius |
| 6,710,941 B2 | 3/2004 | Hennen |
| 6,714,173 B2 | 3/2004 | Shinoura |
| 6,811,841 B1 | 11/2004 | Castiglione |

(Continued)

FOREIGN PATENT DOCUMENTS

| | | |
|---|---|---|
| EP | 0971166 | 1/2000 |
| EP | 2110689 | 10/2009 |

(Continued)

OTHER PUBLICATIONS

Shiono, "Elliptical Micro-Fresnel Lenses Fabricated by Electron-Beam Writing Technique," Electronics and Communications in Japan, 1988, vol. 71, No. 5, pp. 100-109.

(Continued)

*Primary Examiner* — Mohammed Hasan

(57) ABSTRACT

An optical film or other optical body has a structured surface comprising Fresnel prisms. The Fresnel prisms define a complex topography. For example, a first and second Fresnel prism may have elongated first and second plan view shapes that form a "wye" (Y-shaped) feature. Alternatively or in addition, the Fresnel prisms may be arranged such that slopes of the Fresnel prisms define one or more saddle points. Furthermore, one or more of the Fresnel prisms may have prism shapes in plan view that include undulating portions, and the Fresnel prisms may be arranged in a slope sequence that defines one or more inflection points. The Fresnel prisms may be refractive or reflective, and they may provide the structured surface with a 3-dimensional appearance.

36 Claims, 16 Drawing Sheets

(56) References Cited

U.S. PATENT DOCUMENTS

| | | |
|---|---|---|
| 7,102,820 B2 | 9/2006 | Peterson |
| 7,139,123 B2 | 11/2006 | Chubachi |
| 7,178,947 B2 | 2/2007 | Marks |
| 7,264,872 B2 | 9/2007 | Walker |
| 7,298,533 B2 | 11/2007 | Petersen |
| 7,433,105 B2 | 10/2008 | Mau |
| 7,438,438 B2 | 10/2008 | Sandell |
| 7,852,556 B2 | 12/2010 | Huang |
| 8,009,354 B2 * | 8/2011 | Schubert et al. ............ 359/460 |
| 8,033,674 B1 | 10/2011 | Coleman |
| 2002/0186566 A1 | 12/2002 | McKenney |
| 2003/0090813 A1 | 5/2003 | Servatius |
| 2004/0109330 A1 | 6/2004 | Pare |
| 2005/0095407 A1 | 5/2005 | Coburn |
| 2005/0112324 A1 | 5/2005 | Rosenbaum |
| 2006/0198033 A1 * | 9/2006 | Soyama et al. ............ 359/742 |
| 2008/0055932 A1 | 3/2008 | Chao |
| 2008/0213541 A1 | 9/2008 | Schilling |
| 2009/0067062 A1 * | 3/2009 | Suzuki et al. ............ 359/742 |
| 2010/0079861 A1 | 4/2010 | Powell |
| 2012/0038990 A1 | 2/2012 | Hao |
| 2014/0009836 A1 | 1/2014 | Weber |
| 2014/0009838 A1 | 1/2014 | Weber |

FOREIGN PATENT DOCUMENTS

| | | |
|---|---|---|
| JP | 5-177802 | 7/1993 |
| JP | 2006159667 | 6/2006 |
| WO | WO 2007-061193 | 5/2007 |
| WO | WO 2010-120845 | 10/2010 |
| WO | WO 2010/120864 | 10/2010 |
| WO | WO 2010-120871 | 10/2010 |
| WO | WO 2010-120971 | 10/2010 |
| WO | WO 2010-121019 | 10/2010 |
| WO | WO 2011/088161 | 7/2011 |

OTHER PUBLICATIONS

PCT International Search Report for PCT/US2013/049352, mailed Jan. 2, 2014.

Brochure by 3M Architectural Markets entitled "3M™ DI-NOC™ Architectural Finishes, Collection 2011-2013" 2007, 2 pages, Dec. 9, 2013.

Brochure by 3M Commercial Graphics Group, "3M™ Accentrim™ Bevel Tape" 2003, 2 pages, Apr. 23, 2003.

Marschner, "Measuring and Modeling the Appearance of Finished Wood", ACM Transactions on Graphics, SIGGRAPH Proceedings, 2005, vol. 24, No. 3, pp. 727-734, December.

* cited by examiner

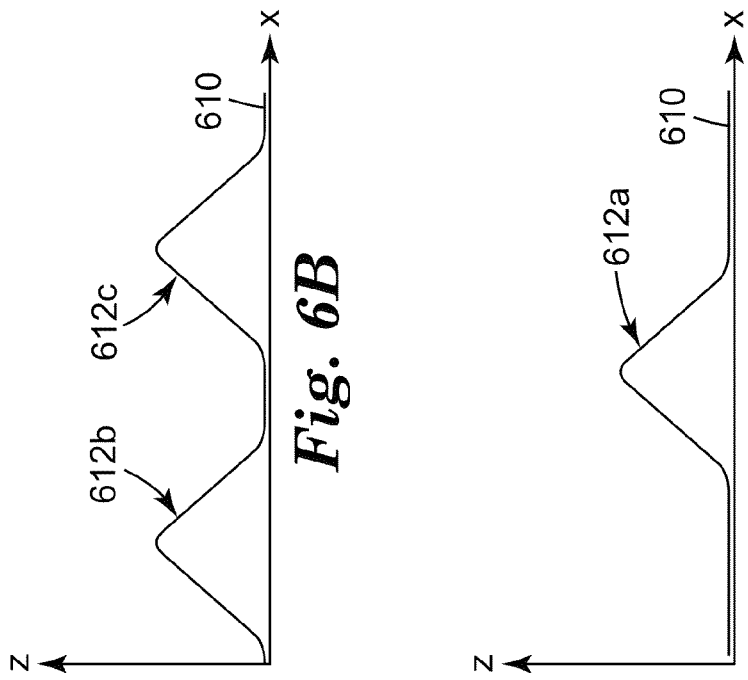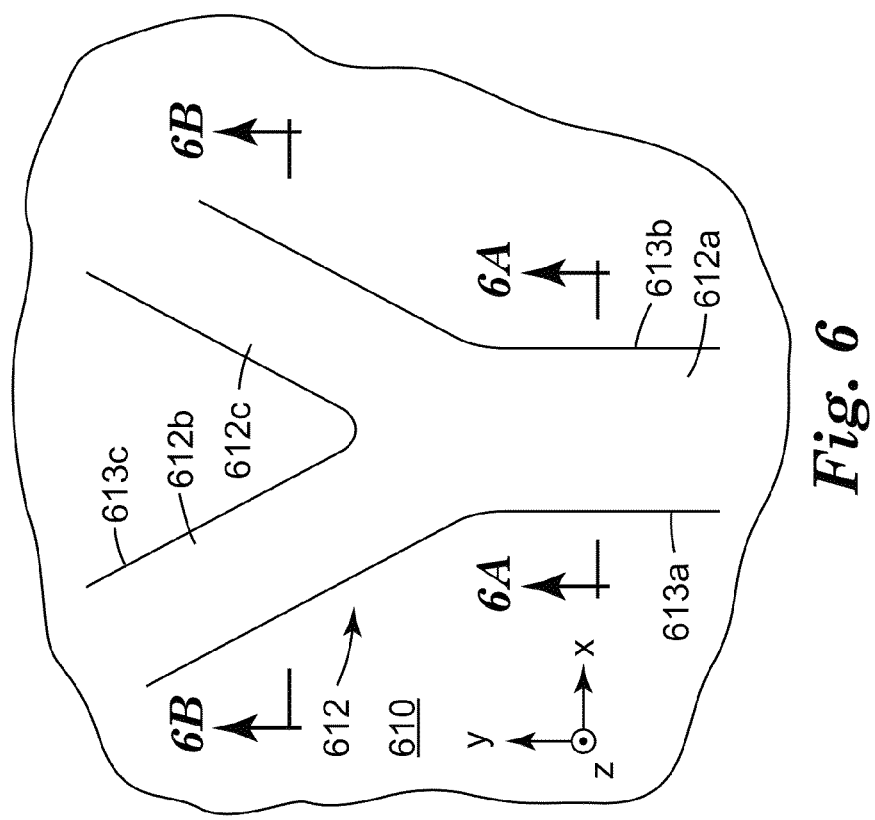

OPTICAL BODY WITH FRESNEL-RENDERING OF COMPLEX TOPOGRAPHICAL SURFACE

FIELD

The present disclosure relates to, among other things, refractive and reflective optical films and related optical bodies having a structured surface comprising Fresnel prisms. The disclosure also relates to articles and systems incorporating such optical bodies, and methods of making and using such optical bodies.

BACKGROUND

About 200 years ago, French physicist Augustin-Jean Fresnel is said to have developed thinner, lighter lenses for use in early 19th century lighthouses. We refer to these lenses today as Fresnel lenses. Since that time, Fresnel lenses have been used in a multitude of applications to provide focusing of light in a thinner and lighter form than could be provided by a bulk optical lens. It was also found that curved mirrors could be replaced by analogous thin, faceted constructions by making the facets reflective. Such mirrors are referred to as Fresnel mirrors.

BRIEF SUMMARY

We have developed a family of optical films and other optical bodies that extend the basic principles of Fresnel lenses and Fresnel mirrors to more complex topographical surfaces. Like conventional Fresnel lenses and Fresnel mirrors, these new optical bodies have structured surfaces on which are formed Fresnel prisms. However, the Fresnel prisms of the new optical bodies are shaped, configured, and/or arranged in ways that are unlike any conventional Fresnel lenses or Fresnel mirrors we are aware of.

For example, the Fresnel prisms of the disclosed optical bodies may be configured to represent a rendering of a non-flat "topographical reference surface" ("TRS") whose topography is more complex than, for example, a simple spherical dome or a simple spherical depression. The structured surface of Fresnel prisms may be said to be a "rendering" of the TRS because, ignoring discontinuities or other anomalies that occur along the edges of the Fresnel prisms, the facets of the prisms may have directional slopes that collectively approximate the spatial distribution of directional slopes across the surface of the TRS. A "directional slope" in this regard refers to a vector quantity that has both a magnitude, e.g., an angular measure of the slope relative to a reference plane or axis, and a direction; the directional slope at any given point on the facet of a Fresnel prism or on another surface of interest may be completely characterized by the local surface normal vector at the given point. We refer to the "rendering" as a "Fresnel-rendering" because the rendering maps the surface of the TRS onto a structured surface comprising Fresnel prism facets, where the angled facets of the Fresnel prisms are oriented to have the same or similar directional slopes as the directional slopes at corresponding points on the TRS, while the actual heights of at least some of the Fresnel prism facets are less than the actual heights at corresponding points on the TRS, such that the overall height or thickness of the structured surface is typically much less than that of the TRS. Due to the fact that the structured surface has a spatial distribution of directional slopes that is the same as, or similar to, the spatial distribution of directional slopes for the TRS, the structured surface refracts and/or reflects light in a manner similar to how the TRS would (or does) refract/reflect light. As a result, an observer of the optical body with its structured surface, whether in transmitted or reflected light, perceives the optical body as having the 3-dimensional shape of the TRS.

The TRS need not be a real physical surface, and furthermore, it is not in general required that the structured surface comprising the Fresnel prisms be derived from its associated TRS. Nevertheless, it can be useful and enlightening to associate or compare the structured surface of an optical body with a TRS that has the same or similar spatial distribution of directional slopes, since the structured surface of the optical body refracts and/or reflects incident light in a manner that is similar to how such a corresponding TRS would (or does) refract or reflect incident light, and since the optical body, by virtue of its structured surface, may have a 3-dimensional appearance similar to the 3-dimensional appearance of the TRS.

As mentioned above, the TRS may have a complex topography. The structured surface that corresponds to such a TRS would typically also have a similar complex topography, but would also include discontinuities or other anomalies that occur along the edges of the Fresnel prisms. For example, the TRS and structured surface may have one or more Y-shaped topographical feature in plan view, such a feature referred to herein as a "wye". Alternatively or in addition, the TRS and structured surface may have one or more topographical saddle point. Alternatively or in addition, the TRS and structured surface may have features that undulate in plan view and that have a slope sequence along a cross-sectional plane of interest that defines one or more inflection points.

The present application thus describes, among other things, optical bodies that include a structured surface comprising a plurality of Fresnel prisms comprising a first and second Fresnel prism, where the first and second Fresnel prisms have elongated first and second plan view shapes respectively, and in a first region the first and second shapes follow paths that track each other, and where in a second region the first and second shapes follow paths that diverge from each other.

The plurality of Fresnel prisms may also comprise a third Fresnel prism, and the third Fresnel prism may not be present in the first region but may be disposed between the first and second Fresnel prisms in the second region. The third Fresnel prism may have a third plan view shape that is concave in the second region. The third plan view shape may be U-shaped. In the first region, the first and second shapes may follow paths that are parallel to each other. In the first region, the first and second shapes may follow paths that are adjacent to each other. The first Fresnel prism may have a slope and/or width that changes along a length of the first Fresnel prism. The first and second Fresnel prisms may form a wye.

The present application also discloses optical bodies that comprise a structured surface comprising a plurality of Fresnel prisms, wherein at least some (e.g. at least two or at least three) of the Fresnel prisms are configured to form a wye. The plurality of Fresnel prisms may include a first and second Fresnel prism having first and second plan view shapes respectively, and in a first region the first and second shapes may follow paths that track each other, and in a second region the first and second shapes may follow paths that diverge from each other.

The present application also discloses optical bodies that comprise a structured surface comprising a plurality of Fresnel prisms, wherein the Fresnel prisms are configured such that slopes of the Fresnel prisms define at least a first saddle point.

The slopes of the Fresnel prisms may form a first slope sequence along a first cross-sectional plane that intersects the first saddle point, and a second slope sequence along a second cross-sectional plane that intersects the first saddle point, the first slope sequence being concave and the second slope sequence being convex. The slopes of the Fresnel prisms may define a plurality of saddle points which includes the first saddle point. The plurality of saddle points may be in a regular repeating array.

We also disclose optical bodies that comprise a structured surface comprising a plurality of Fresnel prisms comprising a first Fresnel prism, where the Fresnel prisms are arranged in a slope sequence, the slope sequence defining one or more inflection points, and where the first Fresnel prism has a first prism shape in plan view that includes an undulating portion. The first Fresnel prism may have a slope and/or a width that changes along a length of the first Fresnel prism. The undulating portion of the first prism shape may comprise an inflection point.

We also disclose optical bodies that comprise a structured surface comprising a plurality of Fresnel prisms comprising a first Fresnel prism, the first Fresnel prism having a first prism shape in plan view that includes an inflection point. The Fresnel prisms may be arranged in a slope sequence in a cross sectional plane, the slope sequence defining one or more inflection points. The first prism shape may undulate and include a plurality of inflection points.

In any of the disclosed optical bodies: Fresnel prisms may be light transmissive and refractive; the Fresnel prisms may be reflective; the structured surface may provide a 3-dimensional appearance; the plurality of Fresnel prisms may include a first Fresnel prism having a slope and/or width that changes along a length of such first Fresnel prism; the structured surface may be formed in a first material layer, and the optical body may further comprise a planarizing layer in mating contact with the structured surface, and the planarizing layer may comprise a nanovoided material; the structured surface may be formed in a first material layer, and the optical body may further comprise an indicia layer attached directly or indirectly to the first material layer.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The disclosure may be more completely understood in connection with the accompanying drawings, in which:

FIG. 6 is a schematic plan view of another topographical reference surface (TRS) having a wye feature in the form of a Y-shaped ridge;

FIGS. 6A and 6B are schematic cross-sectional views through cut lines 6A-6A and 6B-6B of FIG. 6;

The schematic drawings presented herein are not necessarily to scale; however, graphs are assumed to have accurate scales unless otherwise indicated. Like numbers used in the figures refer to like elements.

DETAILED DESCRIPTION

As mentioned above, we disclose herein inter alia optical articles such as optical films or the like in which a structured surface is shaped, formed, or otherwise configured to have Fresnel prisms formed therein. The structured surface (in particular, non-vertical facets of the structured surface) defines a complex topography. The structured surface may be considered to comprise a Fresnel-rendering of a non-flat topographical reference surface (TRS) which has the same or similar complex topography. The complex topography may include "wye" features, saddle points, inflection points in a slope sequence, undulating shapes in plan view, inflection points in plan view, and combinations thereof.

Figure 1:
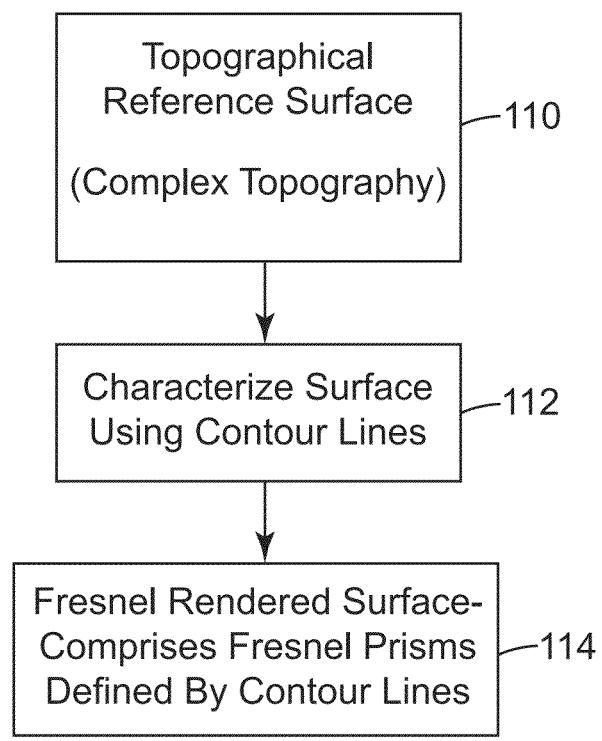
FIG. 1 is a block diagram showing one possible relationship between a topographical reference surface (TRS) and a corresponding Fresnel-rendered structured surface.

In FIG. 1, we see a block diagram that shows one possible relationship between a TRS and a corresponding Fresnel-rendered structured surface. In this case, a TRS of interest is selected, designed, or otherwise provided in box 110. The TRS has a complex topography. As such, the TRS may for example have one or more wye feature, saddle point, inflection point, or undulating shape, or combinations thereof. In box 112, the TRS is characterized with the use of contour lines. A contour line is a locus of points on the surface whose perpendicular distance from a reference plane (e.g., whose height above the reference plane) is a constant. Families or sets of contour lines may be defined by selecting a series of distinct heights or constants, with each contour line in the set being associated with a given one of the distinct heights or constants. In general, any given contour line need not be strictly "linear", i.e., need not be straight, but in some cases one or more of the contour lines, or portions thereof, may be straight. After the contour lines are defined for the TRS, they can then be used to transform the TRS into a structured surface, as indicated at box 114. In one version of this transformation, each pair of adjacent contour lines on the TRS can have identical or substantially identical counterpart lines on the structured surface, but on the structured surface, those lines define the opposite edges or boundaries of a single Fresnel prism, and between those lines is the inclined facet of that Fresnel prism. The inclined facet has a slope or curvature which may vary along the length or path of the Fresnel prism (although for some Fresnel prisms the slope or curvature may be constant) that matches or substantially matches the slope or curvature of the portion of the TRS at corresponding points between the adjacent contour lines at issue.

The resulting structured surface may be said to be a Fresnel-rendering of the TRS. This is because, on the one hand, the spatial distribution of directional slopes of the structured surface, which is determined substantially by the directional slopes of the inclined facets of the Fresnel prisms, is the same as or similar to the spatial distribution of directional slopes of the TRS. On the other hand, unlike the TRS, the structured surface is segmented, grooved, or otherwise subdivided into a plurality of Fresnel prisms. The overall height or thickness of the structured surface is thus typically much less than that of the TRS, just as the thickness of a conventional Fresnel lens is much less than the thickness of the bulk optic lens which it mimics.

As mentioned above, the TRS need not be a real physical surface, and furthermore, there is no requirement that the structured surface comprising the Fresnel prisms be derived from its associated TRS. Nevertheless, it can be useful and enlightening to associate or compare the structured surface of an optical body with a TRS that has the same or similar spatial distribution of directional slopes, since the structured surface of the optical body refracts and/or reflects incident light in a manner that is similar to how such a corresponding TRS would (or does) refract or reflect incident light, and since the optical body, by virtue of its structured surface, may have a 3-dimensional appearance similar to the 3-dimensional appearance of the TRS.

The film or other optical body with the Fresnel-rendered structured surface may be useful for aesthetic purposes, utilitarian purposes, or both. For example, a film having a Fresnel-rendered structured surface may be adhered to a clear window or shield, e.g. with a layer of optically clear pressure sensitive adhesive and with the structured surface facing away from the window and exposed to air, such that sunlight or other light can still pass through the window/film combination e.g. for purposes of illumination, but where light is refracted by the structured surface of the film in an aesthetically pleasing pattern that also obscures objects on the other side of the window. The pattern-wise refraction provided by the structured surface of the film may also give the appearance of a 3-dimensional image which corresponds to the 3-D appearance of the corresponding TRS. The facets of the Fresnel prisms may also be metalized, vapor coated, or the like so that they are reflective rather than refractive, or they may be partially metalized so that they are partially refractive (and thus partially transmissive to sunlight or other light) and partially reflective.

Some surfaces suitable for use as topographical reference surfaces with complex topography can be found in nature. Examples may include a country landscape of rolling hills and valleys, or undulating patterns created by desert sand dunes, or the wave-like nature of the figure of certain types of wood such as curly maple, flame maple, or flame birch. With regard to the last example involving the figure of wood, the word "figure" is italicized in the preceding sentence and throughout this document to distinguish it from the more common meaning of the word "figure", namely, in reference to drawings, e.g., FIG. 1, FIG. 2, and so forth. Figure is a characteristic of some particularly desirable and expensive wood types. It is associated with stripes or other markings that are distinct from the wood grain, and that shift in appearance with changes in illumination geometry and/or observation geometry. For example, a violin or guitar made of a highly figured wood may exhibit stripes or other markings that appear to shift in position along the surface of the wood as the instrument is tilted relative to a given light source and/or observer. The shifting visual effect of the wood figure gives a 3-dimensional quality to the appearance of the wood.

Figure 2A:
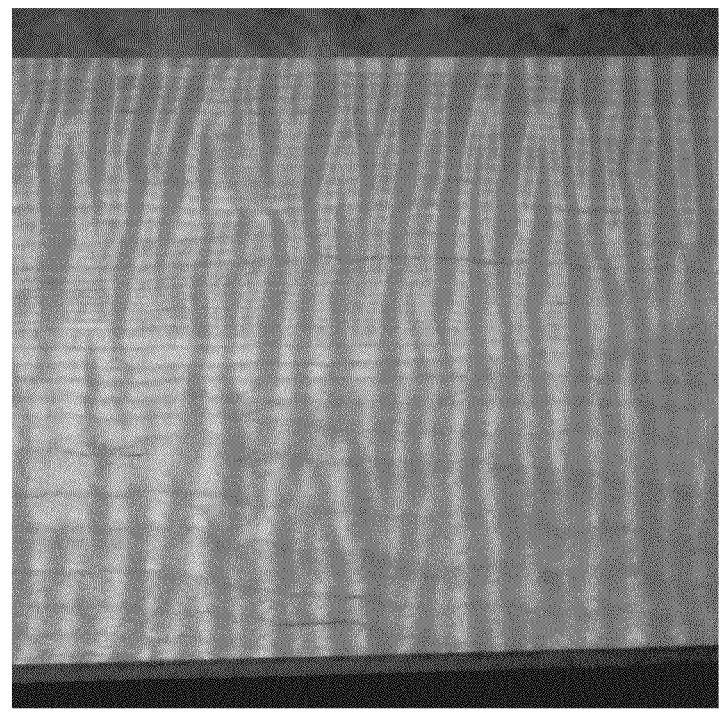
FIG. 2A is a photograph of a piece of flame maple (wood), the photograph showing both the grain and the figure of the wood.
Figure 2B:
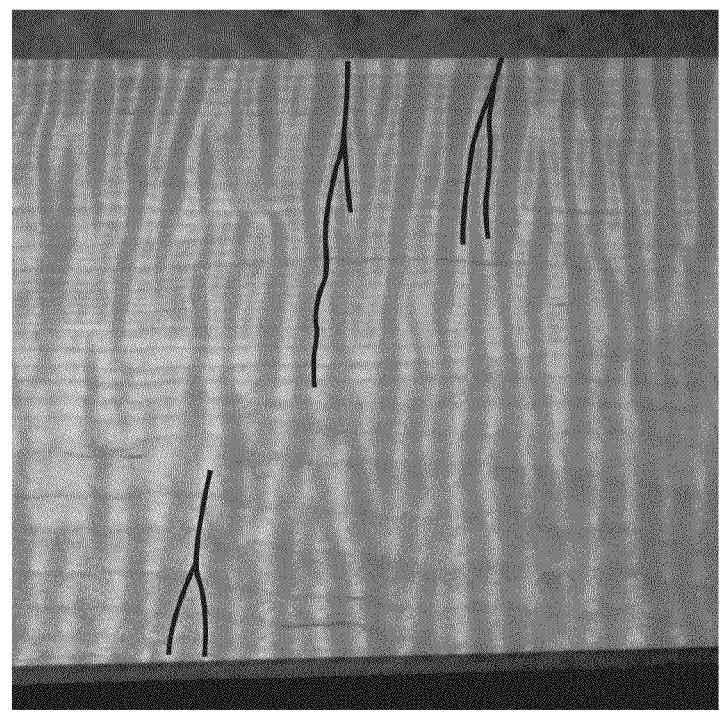
FIG. 2B is the same photograph as FIG. 2A, but with black lines superimposed on the photograph to identify some wye features of the wood.

A photograph of a piece of flame maple is shown in FIG. 2A. From the perspective of the figure, individual wood grain features can be seen extending generally horizontally, or left to right. In contrast, light and dark stripes or bands can be seen extending generally vertically. The vertical stripes or bands seen in the figure are manifestations of the figure of the wood under the particular illumination and observation conditions used to take the photograph. Note that many or most of the vertical stripes or bands are not simple straight linear features, but follow more complicated paths. In some cases, portions of these paths can be seen to undulate in this plan view. In some cases, the paths form Y-shaped features, which we refer to as wyes or wye features. Some of these are identified in FIG. 2B. That figure is the same photograph as FIG. 2A, but black lines have been superimposed thereon to identify some of the wyes.

Such shapes can form the basis of a non-flat topographical reference surface (TRS) with complex topography.

Figure 3:
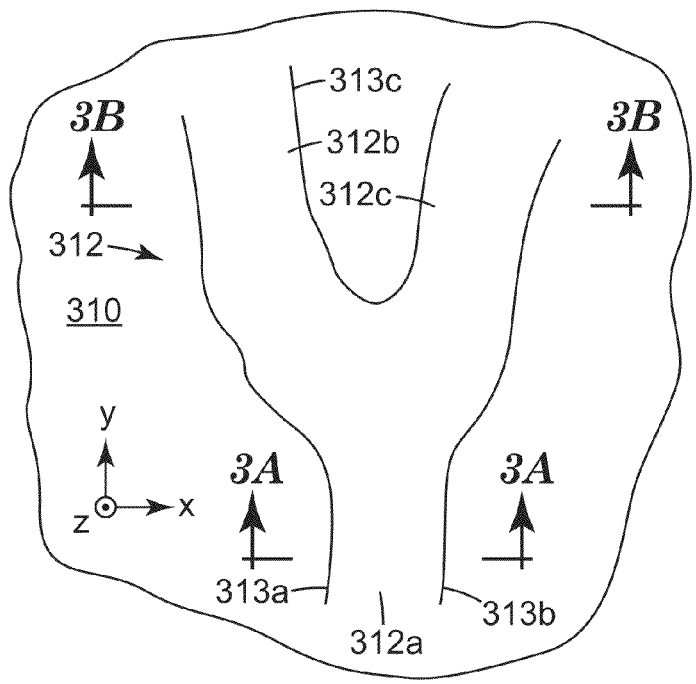
FIG. 3 is a schematic plan view of a topographical reference surface (TRS) having a wye feature in the form of a Y-shaped ridge.

An example of such a TRS is shown in the schematic view of FIG. 3. In that figure, a surface 310 has a complex topography and can form the basis for a Fresnel-rendered structured surface. The surface 310 extends generally parallel to the x-y plane of an x-y-z Cartesian coordinate system. The surface 310 is assumed to be flat except for a Y-shaped ridge or protuberance, referred to as a wye 312. Due to the presence of the wye 312, the surface 310 may be said to be non-flat even though some portions are flat. In an alternative embodiment, the wye 312 may be a valley or depression in the surface rather than a protuberance. In still other embodiments, the surface 310 may be modified such that the wye 312 is surrounded by sloped, curved, undulating, or otherwise non-flat surfaces rather than flat surfaces. For example, the surface 310 may be a small portion of a much larger surface whose topography may be designed to emulate the figure of the wood shown in FIGS. 2A and 2B, such larger surface containing numerous wyes as well as other complex and/or simple features. The wye 312 has a base portion 312a which can be considered to split into a first branch portion 312b and a second branch portion 312c. The wye 312 also has boundaries 313a, 313b, 313c as shown, which define the plan-view Y-shape or outline.

Figure 3A:
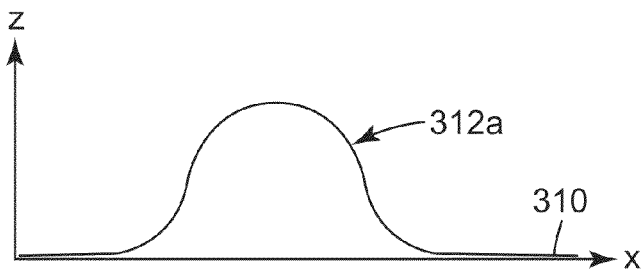
FIGS. 3A and 3B are schematic cross-sectional views through cut lines 3A-3A and 3B-3B of FIG. 3.
Figure 3B:
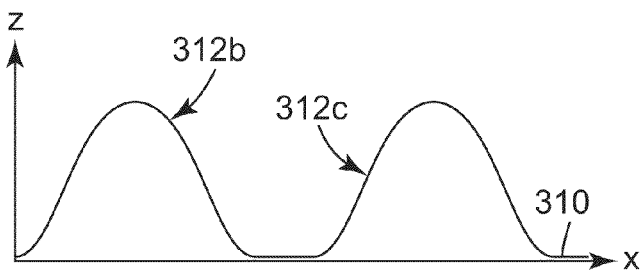

Schematic cross-sectional views of the surface 310 through cut lines 3A-3A and 3B-3B are shown in FIGS. 3A and 3B, respectively. In FIG. 3A, the protuberance of the base portion 312a can be seen in the functional relationship of the z- and x-coordinates of the surface 310. In FIG. 3B, the protuberances of the branch portions 312b, 312c can be seen in the same functional relationship. In the cross-sectional views of FIGS. 3A and 3B, the slope (or the projection of the slope in the x-z plane) of the surface 310 can be ascertained at any x-coordinate position by calculating the slope of the function at that position, i.e., slope=dz/dx. Note that in some places the slope is positive, in some places the slope is negative, and in some places the slope is zero. A positive slope is one in which the change dz (or Δz) in the z-coordinate is positive for a positive change dx (or Δx) in the x-coordinate, and a negative slope is one in which the change dz (or Δz) in the z-coordinate is negative for a positive change dx (or Δx) in the x-coordinate.

The complex topography of the surface 310 can be mimicked in a structured surface of Fresnel prisms, using a Fresnel rendering process such as that described in connection with FIG. 1. First, we may characterize the surface 310 with a set of contour lines. The increment of height that distinguishes one contour line from another can be used to control the degree of coarseness or fineness that will characterize the structured surface. The smaller the height increment, the more contour lines will be included in the pattern, and the smaller the spacing between adjacent contour lines; the larger the height increment, the fewer contour lines in the pattern, and the larger the spacing between adjacent contour lines. In any case, the contour lines can be used as guides to define Fresnel prisms on the Fresnel-rendered structured surface corresponding to the surface 310. Such a Fresnel-rendered surface is shown as structured surface 410 in FIG. 4.

The structured surface 410 can be considered to be a transformation of the surface 310, where the transformation corresponding to the Fresnel-rendering substantially preserves the directional slope at each (x,y) position, but subdivides the surface 410 into distinct segments or grooves in the form of individual Fresnel prisms between which abrupt changes in height occur, so that the overall height or thickness of the surface 410 is much smaller than that of the surface 310. (The surface 310 may also or alternatively be considered to be a transformation of the surface 410.) The transformation can be adapted in numerous ways, e.g., rather than a 1:1 correspondence of (x,y) coordinates between surfaces 310 and 410, a scale factor greater than or less than 1 can be used such that the structured surface 410 is magnified or de-magnified (respectively) relative to the uninterrupted surface 310, or different scale factors can be used in the x- and y-directions to introduce a distortion of one surface relative to the other.

The surface 410 has a wye 412 which is a Fresnel-rendered representation of the wye 312 of surface 310. Similar to surface 310, the surface 410 may be flat except for the wye 412. Similar to the wye 312, the wye 412 has a base portion 412a and two branch portions 412b, 412c. But unlike the wye 312, the wye 412 is subdivided into distinct Fresnel prisms 416. The faceted surfaces of the Fresnel prisms 416 are seen in the plan view of FIG. 4, but the vertical faces of the Fresnel prisms 416 are not. The faceted surfaces are bounded along opposite edges of each Fresnel prism, such edges shown as boundary lines 414 in FIG. 4. The boundary lines 414 curve and meander along paths which define the plan-view shape and path of each of the Fresnel prisms 416. The boundary lines 414 may follow paths in the x-y plane that correspond substantially or exactly to those of contour lines for the wye 312. That is, a contour map of the wye 312 may have the same or substantially the same plan view appearance as the wye 412 of FIG. 4, but where the boundary lines 414 would represent contour lines on an uninterrupted surface rather than the edges or boundaries of distinct Fresnel prisms. Thus, the contour lines on a contour map of the uninterrupted surface 310 can form the basis for determining where to subdivide the surface into individual Fresnel prisms. Properties and characteristics of contour lines and contour maps are therefore also applicable to the boundary lines 414 of FIG. 4. For example, on a contour map, if the spacing between two adjacent contour lines is variable along the path of the contours, places where the spacing is small correspond to a more steeply sloped surface than places where the spacing is larger. Similarly, if the spacing between two adjacent lines 414 bounding a given Fresnel prism 416 is variable along the path of the Fresnel prism, the inclined facet of the Fresnel prism is more steeply sloped in places where the spacing is small compared to places where the spacing is larger. Another property of a contour map is that the gradient of an inclined surface at any point on a contour line is perpendicular to the contour line at that point. Similarly, the gradient of the slope at any point on a given Fresnel prism 416 is perpendicular to the closest boundary line 414 to that point.

Figure 4:
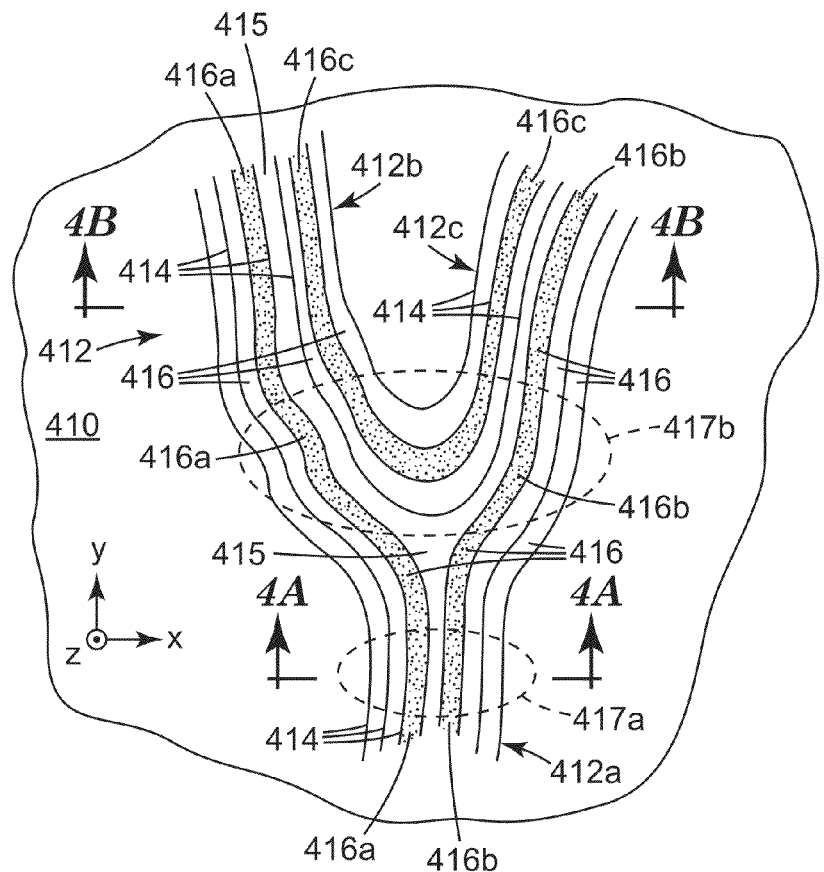
FIG. 4 is a schematic plan view of a structured surface corresponding to the TRS of FIG. 3, the structured surface comprising Fresnel prisms that define a wye-feature corresponding to the wye-feature of FIG. 3.

The foregoing paragraph assumes that the adjacent contour lines are at different heights above the reference plane, i.e., that there is a height differential between the adjacent contour lines. In some cases, e.g. at the uppermost portion of a ridge of the TRS or at the lowermost portion of a valley of the TRS, two adjacent contour lines may be at the same height above the reference plane, i.e., the height differential between these adjacent contour lines may be zero. The two adjacent boundary lines 414 that correspond to such adjacent contour lines may then form the boundaries or edges of a flat region on the structured surface 410. Such a flat region, even though it is bounded by two adjacent lines 414, is not considered to be a Fresnel prism, since it has no vertical face and its only facet has a zero inclination. An example of such a region is shown in FIG. 4 as region 415. For such a region, a widening or narrowing of the space between its boundary lines 414 is not associated with any increase or decrease in the magnitude of slope (since the slope is exactly or substantially zero), and a line drawn perpendicular to any such boundary line 414 does not represent the gradient of the slope, again since the slope of such region is zero.

We may refer to the height associated with adjacent boundary lines 414 as H, this parameter also being the height differential between adjacent contour lines corresponding to such adjacent lines 414. We may also refer to the spacing between adjacent boundary lines 414 as W, this parameter also being the (plan view) spacing between the adjacent contour lines that correspond to such adjacent lines 414. With these parameters so defined, the Fresnel prisms 416 on the surface 410 are prisms of constant height H and whose width is the (potentially variable) distance W between the boundary lines 414 at any given location. Furthermore, the magnitude of the slope of a given prism 416 at that location is H/W. The height H represents the vertical distance between the corresponding adjacent contour lines, and is selected to provide for a Fresnel prism 416 of reasonable height for the process used to make them. The surface of a given Fresnel prism 416 has the same directional slope at a given point on its inclined facet as that of the corresponding TRS (surface 310) at that point. For ease of fabrication, the constant height Fresnel prism approach may be modified e.g. by replacing any given Fresnel prism with two or more Fresnel prisms of smaller heights and smaller widths, and/or by replacing two or more adjacent Fresnel prisms with a single Fresnel prism of greater height and greater width, e.g. in cases where the constant height approach produces Fresnel prisms that are unusually wide or unusually narrow due to the value of the local slope.

In an alternative transformation between the TRS and the Fresnel-rendered structured surface, the height differential H between adjacent contour lines on the TRS may be changed from one contour line to the next in such a way that the spacing W between adjacent contour lines (in plan view) is held constant, or, for some surface topographies, as constant as reasonably possible. Such a procedure produces Fresnel prisms on the corresponding Fresnel-rendered structured surface whose heights H are not the same, but whose widths W may be the same, or at least similar to each other. In still other alternatives, both the height differential H and the width W may be non-uniform, producing on the structured surface Fresnel prisms of variable height H and width W, but whose directional slopes at least approximately match the directional slopes at corresponding locations on the TRS.

In reference to FIG. 4, three of the Fresnel prisms 416 have been shaded so that they may be more easily identified and discussed. The shaded prisms are Fresnel prisms 416a, 416b, and 416c. These prisms have been selected to demonstrate certain properties and characteristics of the wye 412, although other ones of the Fresnel prisms 416 could also have been selected for this purpose. In describing these properties and characteristics, we also identify two regions of the structured surface 410 in this plan view: a region 417a, in an area of the base portion 412a of the wye, and a region 417b, in an area where the branch portions 412b, 412c begin to diverge from the base portion 412a.

In the region 417a, the Fresnel prisms 416a, 416b follow paths in plan view (as seen from their respective boundary lines) that track each other. The paths track each other because, for example, if one prism follows a straight path at a particular point, then near that point the other prism also follows a straight path parallel to the other path, or if one prism follows a curved path at a particular point, then near that point the other prism also follows a curved path with the same or similar curvature as the other path. With this clarification, the prisms 416a, 416b can be seen to follow paths that track each other in the region 417a. These paths are not precisely straight in this region, but are straight enough, and track each other well enough, to be able to further describe them as being parallel to each other in the region. Still further, although the prisms 416a, 416b do not share a common boundary line 414, they are separated from each other in the region 417a not by any other Fresnel prism 416 but only by a portion of the flat region 415, and hence, the prisms 416a, 416b and their respective paths may still be said to be adjacent to each other in the region 417a.

In the region 417b, the Fresnel prisms 416a, 416b follow paths in plan view that diverge from each other. Furthermore, the Fresnel prism 416c is present or disposed in the region 417b, but is not present and not disposed in the region 417a. The plan view path of the Fresnel prism 416c is also concave and U-shaped in the region 417b. Note in this regard that a Fresnel prism is deemed to have a plan view shape that is concave, U-shaped, or the like as long as at least one orientation of the surface can be found in which the plan view of the Fresnel prism has such shape. Portions of the plan view paths of the Fresnel prisms 416a, 416b, 416c can also be seen to undulate.

Figure 4A:
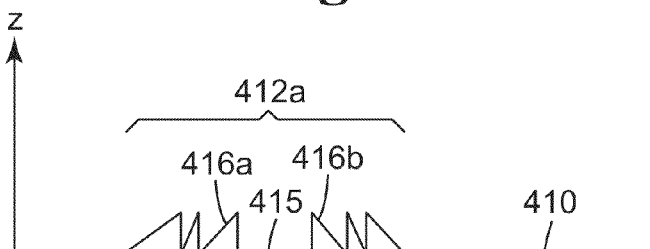
FIGS. 4A and 4B are schematic cross-sectional views through cut lines 4A-4A and 4B-4B of FIG. 4.
Figure 4B:
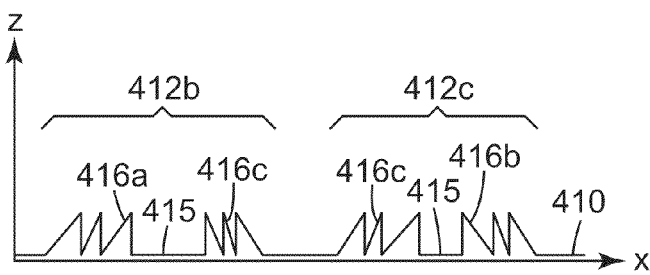

Schematic cross-sectional views of the structured surface 410 through cut lines 4A-4A and 4B-4B are shown in FIGS. 4A and 4B, respectively. In FIG. 4A, the Fresnel prisms 416 (not labeled in this figure except for the Fresnel prisms 416a and 416b) and the flat region 415 which make up the base portion 412a can be seen in the functional relationship of the n- and x-coordinates of the surface 410. In FIG. 4B, the Fresnel prisms 416 (again not labeled here except for the Fresnel prisms 416a, 416b, and 416c) and the flat region 415 which make up the branch portions 412b, 412c can be seen in the same functional relationship. In the cross-sectional views of FIGS. 4A and 4B, the slope (or the projection of the slope in the x-z plane) of the surface 410 can be ascertained at any x-coordinate position by calculating the slope of the function at that position, i.e., slope=dz/dx. Note that in some places the slope is positive, in some places the slope is negative, and in some places the slope is zero.

The inclined facets of the Fresnel prisms 416 in FIGS. 4A and 4B are drawn as being not only inclined or sloped, but also planar or straight in transverse cross-section. This may be an approximation of the actual surface topography of the TRS. For example, the surface of the TRS may be smoothly and continuously curved over the region of the wye 312, whereas the inclined facet of a given Fresnel prism 416 may be a planar or simple wedge-like approximation of the corresponding smoothly curved portion of the surface of the wye 312. Stated differently, the directional slope of the Fresnel prism 416 may have a constant or substantially constant value along any cross-sectional plane that intersects the Fresnel prism 416 transversely, the constant directional slope being an approximation of a variable directional slope at a corresponding portion of the TRS. In an alternative embodiment, the inclined facet of the given Fresnel prism 416 may have the same smoothly curved topography as the corresponding portion of the surface of the wye 312. Stated differently, the directional slope of the Fresnel prism 416 may vary along any cross-sectional plane that intersects the Fresnel prism 416 transversely, the variable directional slope being the same as or similar to the variable directional slope at a corresponding portion of the TRS.

Figure 4C:
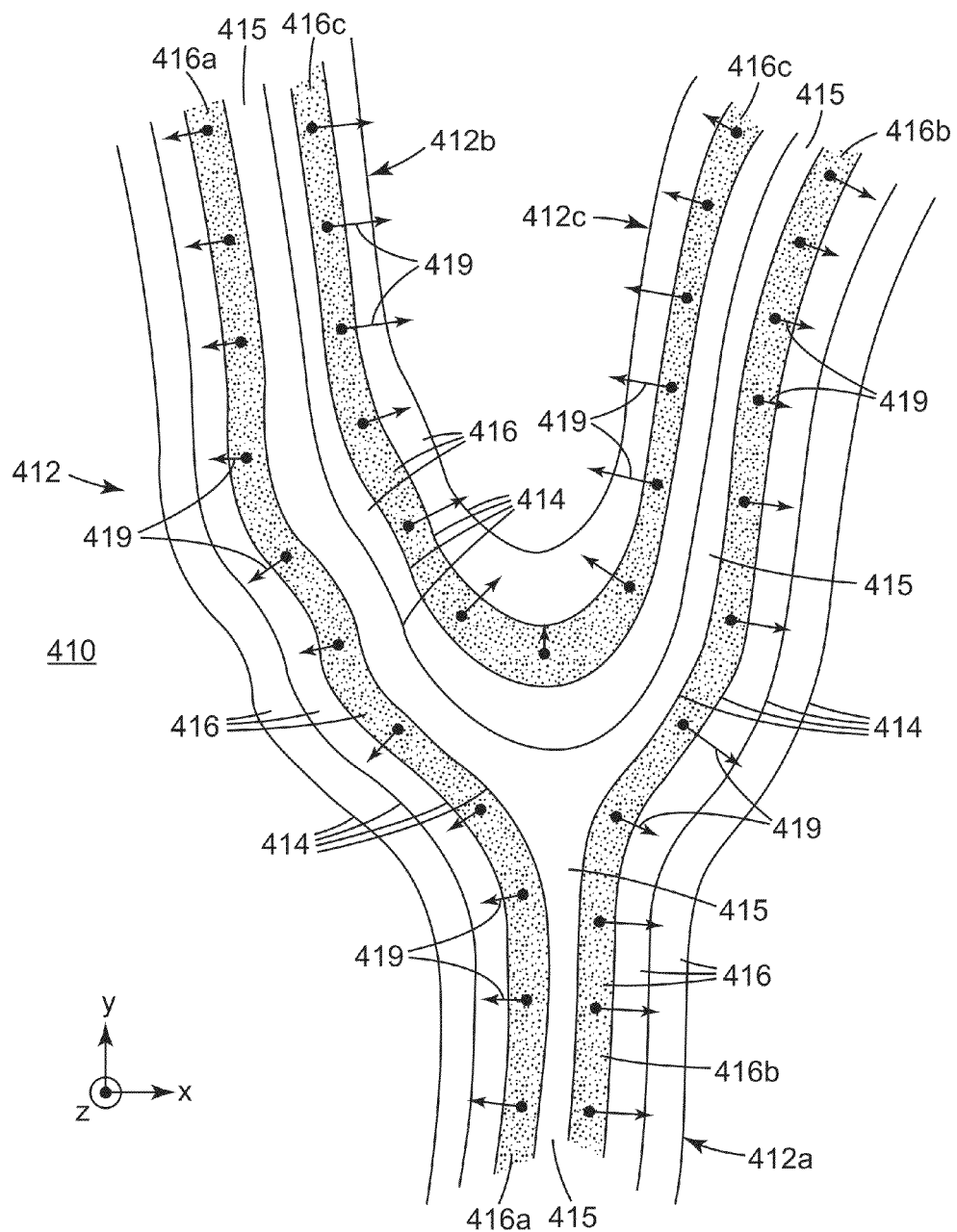
FIG. 4C is an enlarged view of FIG. 4, where arrows representing surface normal vectors are superimposed on several of the Fresnel prisms to illustrate how the directional slope changes as a function of position in the plane of the film.

Turning now to FIG. 4C, we see there an enlarged view of FIG. 4, where arrows 419 representing surface normal vectors are superimposed on the three shaded Fresnel prisms 416a, 416b, 416c. The arrows 419 illustrate how the directional slope changes as a function of position across the structured surface 410, e.g. in the plane of a film embodying such surface. The direction of a given arrow 419 is parallel to the gradient of the slope at a given point on a Fresnel prism 416. In accordance with the above discussion, one can see that the direction of a given arrow 419 at a given point is substantially perpendicular to the portion of the line 414 that is closest to that point. We have attempted to draw the lengths of the arrows 419 to be indicative of the steepness of the slope, with a longer arrow representing a steeper slope than a shorter arrow. The steeper slopes (longer arrows 419) occur at places where a given Fresnel prism is narrower (spacing between adjacent boundary lines 414 is smaller), and shallower slopes (shorter arrows 419) occur at places where the Fresnel prism is wider (spacing between adjacent boundary lines 414 is larger). The arrows 419 are drawn in FIG. 4C only for the prisms 416a, 416b, and 416c, but the reader will understand that similar arrows can be drawn in the same fashion for the other prisms 416. In the case of region 415, arrows 419 for that region would simply be dots, i.e. they would have zero length, because the slope in that region is zero and the arrows in that region would all be parallel to the z-axis.

Figure 5:
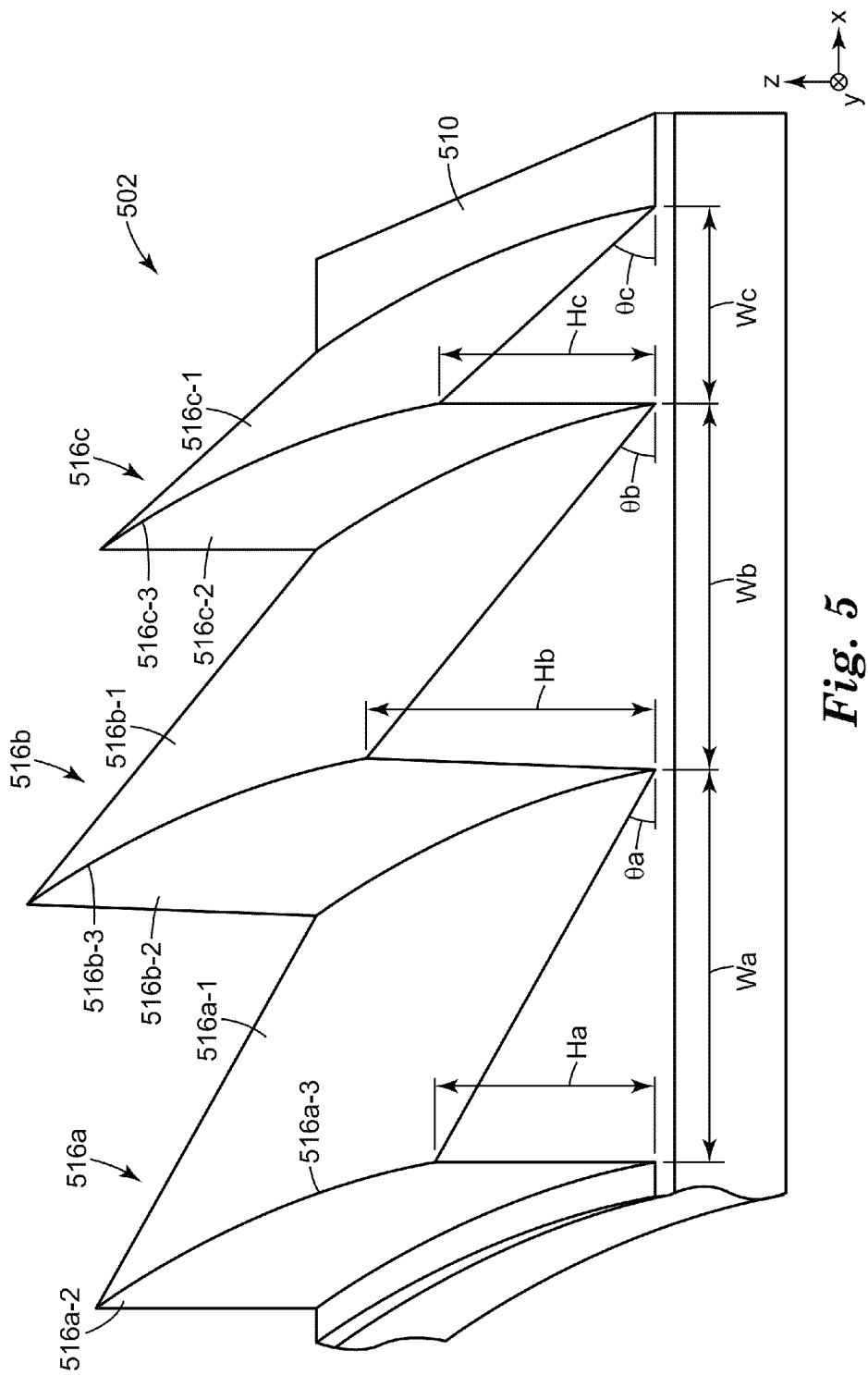
FIG. 5 is a schematic view, partially in cross-section and partially in perspective view, of a portion of a film or other optical body with a structured surface comprising Fresnel prisms.

In FIG. 5 we show a portion of a film or other optical body 502 with a structured surface 510 comprising Fresnel prisms, three of which are individually labeled 516a, 516b, 516c, and which can collectively be referred to as Fresnel prisms 516. The structured surface 510 may be the same as or similar to the structured surface 410, or the same as or similar to other structured surfaces disclosed herein. The film 502 is shown as having a 2-layer construction, with a structured layer 506 attached to a flat carrier layer 504. The structured layer 506 may for example be or comprise a cured resin material whose structured surface 510 was obtained by pressing an uncured resin against a drum or other tool whose structured surface was an inverted version of the structured surface 510, and then separating the resin from the tool after or during curing. In alternative embodiments, the film 502 may have only a single layer, e.g., layers 504 and 506 may combine to form only one distinguishable layer, or the film 502 may alternatively have more than two layers. In cases where the Fresnel prisms 516 are reflective, a metal coating or other reflective layer or layers can be applied to some or all inclined facets of the prisms 516. Otherwise, in cases where the film 502 is tailored to transmit and refract light, the film and its constituent layers may be highly transparent to visible light. The film and its constituent layers may be substantially water clear, or it or they may be colored or tinted e.g. with one or more dyes and/or pigments, or by being made from a material that is naturally clear but colored.

The view of FIG. 5 shows the cross-sectional shape of each of the Fresnel prisms 516 in the x-z plane. In this regard, a Fresnel prism is typically characterized by two facets: a vertical facet, and an inclined facet. By "vertical facet" we mean a facet that is perpendicular, or nearly perpendicular, to the plane of the film (or the plane of the structured surface). An angle formed between such a facet and the x-y plane may for example be 90 degrees or slightly less, e.g., in a range from 80 to 90 degrees to provide some relief to allow the film to be more easily separated from a molding tool. In FIG. 5, surfaces 516a-2, 516b-2, and 516c-2 are examples of vertical facets of Fresnel prisms. By "inclined facet" we mean a facet that is inclined relative to the plane of the film or structured surface, but less inclined than the vertical facet. An angle formed between the inclined facet and the x-y plane may for example be in a range from 0.01 to 50 degrees, and more typically is in a range from 0.1 to 40 degrees, but these typical ranges should not be construed in an unduly limiting fashion. In FIG. 5, surfaces 516a-1, 516b-1, and 516c-1 are examples of inclined facets of Fresnel prisms. In some cases, the (putative or imaginary) vertical facets of back-to-back Fresnel prisms may coincide with each other and thus disappear, as shown below in connection with FIGS. 7, 7A, and 7B.

The inclined facet and the vertical facet meet to form a ridge along the top of each prism. Examples of such ridges can be seen as ridge 516a-3 of Fresnel prism 516a, ridge 516b-3 of Fresnel prism 516b, and ridge 516c-3 of Fresnel prism 516c. The ridges may be sharp and abrupt, or rounded and gradual. When the structured surface 510 is viewed from above (in plan view), the ridges have the appearance of lines that bound the Fresnel prisms, e.g., boundary lines 414 in FIG. 4. Due to the vertical or near-vertical orientation of the vertical facets, these lines typically coincide or substantially coincide with lines associated with the base of each prism, i.e., where the vertical facet of one Fresnel prism meets the inclined facet of an adjacent Fresnel prism, except in cases where the inclined facet of a Fresnel prism meets a horizontal surface (e.g. the left-most prism or the right-most prism in FIG. 4a), or where the inclined facet of one prism meets the inclined facet of an adjacent prism (see e.g. Fresnel prisms 716a, 716b in FIG. 7A below). One or more of the Fresnel prisms, or portions thereof, may in some cases be straight, while other Fresnel prisms or all of the Fresnel prisms, or portions thereof, may be non-straight, e.g., curved. In FIG. 5, the Fresnel prisms 516 are shown as being curved, i.e., the ridges 516a-3, 516b-3, 516c-3 are curved in the x-y plane, and the plan view paths defined by the prisms 516 are similarly curved.

For generality, the Fresnel prisms 516 are shown as having different heights and widths. Prism 516a has a height Ha and a width Wa, the prism 516b has a height Hb and a width Wb, and the prism 516c has a height Hc and a width Wc. These heights and widths correspond to respective slopes or angles of inclination, as indicated by angles θa, θb, θc, respectively. Depending on the shape of the TRS associated with the structured surface 510 and the Fresnel rendering selected, in alternative embodiments, the heights Ha, Hb, Hc may be the same, and/or the widths Wa, Wb, Wc may be the same, and/or the angles of inclination θa, θb, θc, may be the same, in a limited portion or region of the structured surface.

Any of the disclosed embodiments may have a film construction such as that shown in FIG. 5, i.e. with a structured layer 506 attached to a flat carrier layer 504 and with the structured surface 510 exposed to air. Alternatively, any of the disclosed embodiments may have film constructions that are modifications of FIG. 5, e.g., if Fresnel mirrors are desired rather than Fresnel lenses, a metal vapor coat or other thin reflective layer can be applied to the structured surface. Also, as mentioned above, the layers 504 and 506 may be combined to form a single layer. Additional layers and coatings can also be added to only one side or to both sides of the film construction. For example, one or more indicia layer may be added to the construction, where the indicia layer(s) may provide one or more natural pattern (e.g. an image of simulated wood grain) and/or one or more geometric pattern (e.g. a repeating array of one or more geometric shapes) and/or any other suitable pattern or image, e.g. a pattern or image that combines aesthetically and/or functionally with the image or pattern provided by the Fresnel-rendered structured surface.

Whether the Fresnel prisms 516 are configured as lenses or as mirrors (or both), to maximize the refractive and/or reflective power of the prisms 516, the structured surface 510 may be exposed to air or vacuum. Alternatively, a planarizing layer (i.e., a layer whose thickness is comparable to the average prism height, or, in some cases, at least as great as the smallest, the largest, or the average prism height such that the upper surface of the planarizing layer is actually or substantially flat, planar, or smooth) may be provided in mating contact with the structured surface 510, with the refractive index of the planarizing layer being less than that of the structured layer 506. Although such a planarizing layer generally reduces the refractive and reflective power of the prisms 516 relative to air, adequate refractive or reflective power may still be obtained with a sufficiently low refractive index of the planarizing layer relative to the structured layer 506. The refractive index difference between these layers may desirably be at least about 0.1. For the planarizing layer, ultra low index (ULI) nanovoided materials discussed in patent application publications WO 2010/120864 (Hao et al.) and WO 2011/088161 (Wolk et al.), having refractive indices in a range from about n≈1.15 to n≈1.35, may be used.

A plan view of another TRS with complex topography is shown in FIG. 6. In this figure, the surface 610 extends generally parallel to the x-y plane. The surface 610 is assumed to be flat except for a Y-shaped ridge or protuberance, referred to as a wye 612. The wye 612 is similar to the wye 312 of FIG. 3, but the wye 612 is more symmetrical and has branches that are straight, and the topographical profiles of each branch more closely approximate triangles. In an alternative embodiment, the wye 612 may be a valley or depression in the surface rather than a protuberance. Still other alternative embodiments, analogous to the alternative embodiments discussed in connection with FIG. 3, are also contemplated. The wye 612 has a base portion 612a which can be considered to split into a first branch portion 612b and a second branch portion 612c. The wye 612 also has boundaries 613a, 613b, 613c as shown, which define the plan-view Y-shape or outline.

Schematic cross-sectional views of the surface 610 through cut lines 6A-6A and 6B-6B are shown in FIGS. 6A and 6B, respectively. In FIG. 6A, the protuberance of the base portion 612a can be seen in the functional relationship of the z- and x-coordinates of the surface 610. In FIG. 6B, the protuberances of the branch portions 612b, 612c can be seen in the same functional relationship. In the cross-sectional views of FIGS. 6A and 6B, the slope (or the projection of the slope in the x-z plane) of the surface 610 can be ascertained at any x-coordinate position by calculating the slope of the function at that position, i.e., slope=dz/dx. In some places the slope is positive, in some places the slope is negative, and in some places the slope is zero.

In like fashion to the discussion above of FIGS. 3 and 4, the complex topography of the surface 610 can be mimicked in a structured surface of Fresnel prisms using a Fresnel rendering process. First, we may characterize the surface 610 with a set of contour lines. The contour lines can be used as guides to define Fresnel prisms on the Fresnel-rendered structured surface corresponding to the surface 610. Such a Fresnel-rendered surface is shown as structured surface 710 in FIG. 7.

The structured surface 710 can be considered to be a transformation of the surface 610, where the transformation corresponding to the Fresnel-rendering substantially preserves the directional slope at each (x,y) position, but subdivides the surface 610 into distinct segments or grooves in the form of individual Fresnel prisms between which abrupt changes in height occur, so that the overall height or thickness of the surface 710 is much smaller than that of the surface 610. (The surface 610 may also or alternatively be considered to be a transformation of the surface 710.) The transformation can be adapted in numerous ways, as discussed above in connection with FIGS. 3 and 4.

The surface 710 has a wye 712 which is a Fresnel-rendered representation of the wye 612 of surface 610. Similar to surface 610, the surface 710 may be flat except for the wye 712. Similar to the wye 612, the wye 712 has a base portion 712a and two branch portions 712b, 712c. Unlike the wye 612, the wye 712 is subdivided into distinct Fresnel prisms 716. The faceted surfaces of the Fresnel prisms 716 are seen in the plan view of FIG. 7, but the vertical faces of the Fresnel prisms 716 are not. The faceted surfaces are bounded along opposite edges of each Fresnel prism, such edges shown as boundary lines 714 in FIG. 7. The boundary lines 714 follow paths which define the plan-view shape and path of each of the Fresnel prisms 716. The boundary lines 714 may follow paths in the x-y plane that correspond substantially or exactly to those of contour lines for the wye 612. That is, a contour map of the wye 612 may have the same or substantially the same plan view appearance as the wye 712 of FIG. 7, but where the boundary lines 714 would represent contour lines on an uninterrupted surface rather than the edges or boundaries of distinct Fresnel prisms. Thus, the contour lines on a contour map of the uninterrupted surface 610 can form the basis for determining where to subdivide the surface into individual Fresnel prisms, as discussed above.

In the case of FIG. 4, we saw a structured surface 410 that included a flat region 415 separating the two oppositely inclined Fresnel prisms 416a, 416b in the base portion 412a of the wye. In the case of FIG. 7, the structured surface 710 has no corresponding feature, because the oppositely inclined Fresnel prisms 716a, 716b are disposed back-to-back in the base portion 712a of the wye 712, as best seen in FIG. 7A.

If we refer to the height associated with adjacent boundary lines 714 as H, and the spacing between adjacent boundary lines 714 as W, the Fresnel prisms 716 on the surface 710 are prisms of constant height H and whose width is the (potentially variable) distance W between the boundary lines 714 at any given location. Furthermore, the magnitude of the slope of a given prism 716 at that location is H/W. The height H represents the vertical distance between the corresponding adjacent contour lines, and is selected to provide for a Fresnel prism 716 of reasonable height for the process used to make them. The surface of a given Fresnel prism 716 has the same directional slope at a given point on its inclined facet as that of the corresponding TRS (surface 610) at that point. For ease of fabrication or for other reasons, the constant height Fresnel prism approach may be modified or replaced with alternative approaches or transformations between the TRS and the Fresnel-rendered structured surface, as described above.

In reference to FIG. 7, three of the Fresnel prisms 716 have been shaded so that they may be more easily identified and discussed. The shaded prisms are Fresnel prisms 716a, 716b, and 716c. These prisms have been selected to demonstrate certain properties and characteristics of the wye 712, although other ones of the Fresnel prisms 716 could also have been selected for this purpose. In describing these properties and characteristics, we also identify two regions of the structured surface 710 in this plan view: a region 717a, in an area of the base portion 712a of the wye, and a region 717b, in an area where the branch portions 712b, 712c begin to diverge from the base portion 712a.

In the region 717a, the Fresnel prisms 716a, 716b follow paths in plan view (as seen from their respective boundary lines) that track each other. The paths track each other because, for example, if one prism follows a straight path at a particular point, then near that point the other prism also follows a straight path parallel to the other path. The prisms 716a, 716b can be seen to follow paths that track each other in the region 717a. These paths are substantially straight, and parallel to each other, in this region. Also, the prisms 716a, 716b are adjacent to each other in the region 717a.

In the region 717b, the Fresnel prisms 716a, 716b follow paths in plan view that diverge from each other. Furthermore, the Fresnel prism 716c is present or disposed in the region 717b, but is not present and not disposed in the region 717a. The plan view path of the Fresnel prism 716c is also concave and U-shaped in the region 717b.

Figure 7B:
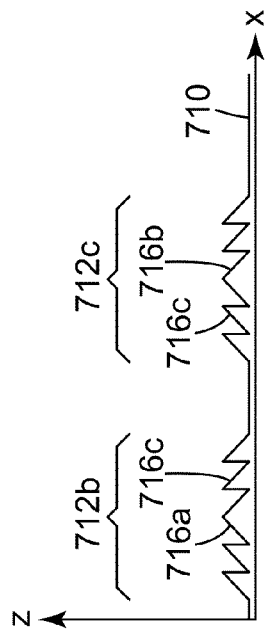
FIGS. 7A and 7B are schematic cross-sectional views through cut lines 7A-7A and 7B-7B of FIG. 7.
Figure 7A:
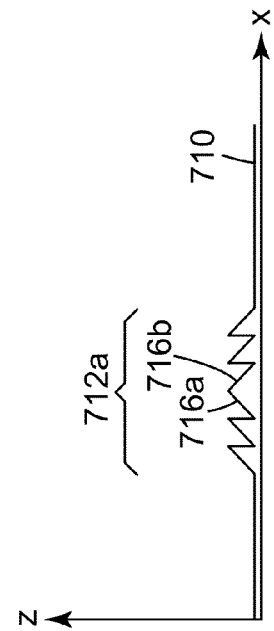
Figure 7:
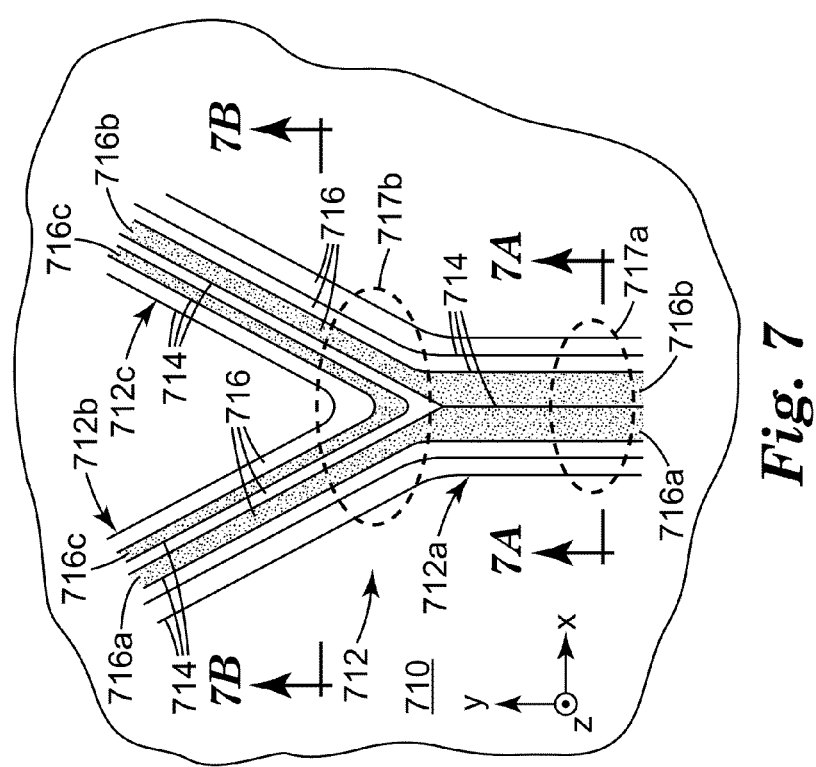
FIG. 7 is a schematic plan view of a structured surface corresponding to the TRS of FIG. 6, the structured surface comprising Fresnel prisms that define a wye-feature corresponding to the wye-feature of FIG. 6.

Schematic cross-sectional views of the structured surface 710 through cut lines 7A-7A and 7B-7B are shown in FIGS. 7A and 7B, respectively. In FIG. 7A, the Fresnel prisms 716 (not labeled in this figure except for the Fresnel prisms 716a and 716b) which make up the base portion 712a can be seen in the functional relationship of the z- and x-coordinates of the surface 710. In FIG. 7B, the Fresnel prisms 716 (again not labeled here except for the Fresnel prisms 716a, 716b, and 716c) which make up the branch portions 712b, 712c can be seen in the same functional relationship. In the cross-sectional views of FIGS. 7A and 7B, the slope (or the projection of the slope in the x-z plane) of the surface 710 can be ascertained at any x-coordinate position by calculating the slope of the function at that position, i.e., slope=dz/dx. Note that in some places the slope is positive, in some places the slope is negative, and in some places the slope is zero.

The inclined facets of the Fresnel prisms 716 in FIGS. 7A and 7B are shown as planar or straight in transverse cross-section, but they may instead be non-planar, for example, they may be continuously curved e.g. with a small degree of curvature, but in any case the orientations of the inclined facets of the Fresnel prisms may be tailored to approximate the spatial distribution of the directional slope of the associated TRS (surface 610).

Figure 8:
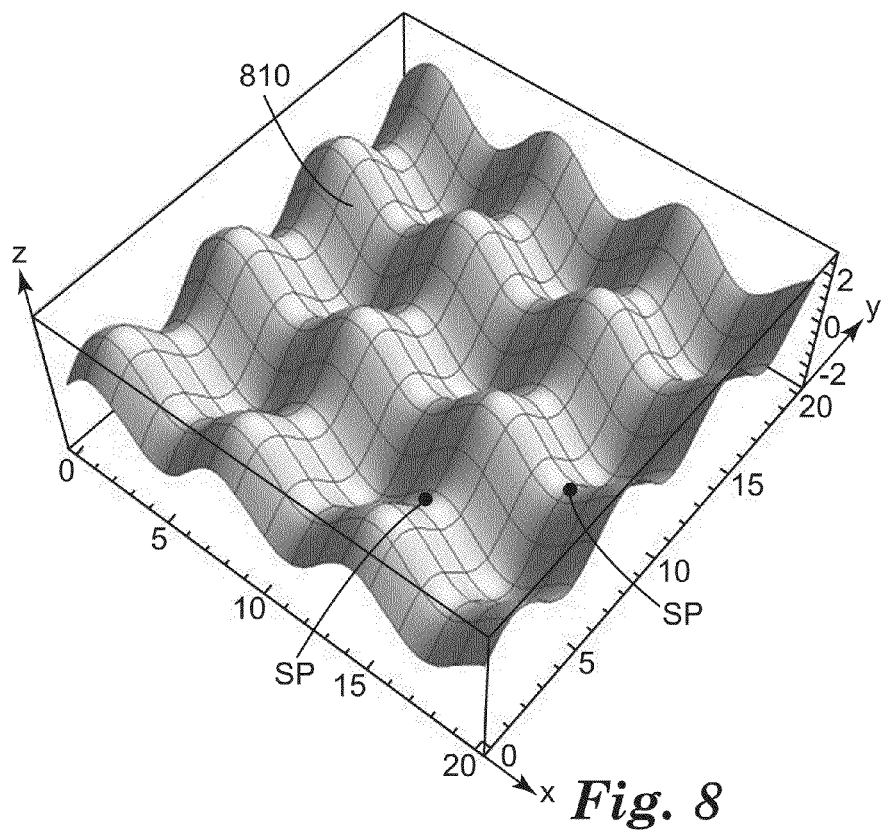
FIG. 8 is a schematic perspective view of a topographical reference surface (TRS) having saddle points and inflection points.

A perspective view of another TRS with complex topography is shown in FIG. 8. In this figure, the surface 810 extends generally parallel to the x-y plane, but it undulates sinusoidally in both the x-z plane and the y-z plane. Grid lines (one set of lines with uniform spacing along the x-axis, and another set of lines with uniform spacing along the y-axis) are drawn on the surface for illustrative purposes so that the 3-dimensional shape of the surface can be better visualized. The height or z-coordinate of any point on the surface 810 is related to the (x,y) coordinates of such point by the function $$z=\sin(x)+\sin(y).$$

This function ranges from a maximum of 2 to a minimum of −2. As can be seen from the figure, the resulting surface 810 provides a pattern of alternating rounded peak and valley features. The alternating pattern also defines saddle points and inflection points. Some of the saddle points are labeled SP in FIG. 8. A saddle point is a point on a surface at which the surface has curvatures of opposite polarity along orthogonal cross-sectional planes. For example, at a given saddle point, the surface 810 may curve upwardly when cross-sectioned along the x-z plane, but may curve downwardly when cross-sectioned along the y-z plane, or vice versa. Stated differently, the surface at, and in the vicinity of, the given saddle point can be said to be convex (e.g. curving upwardly) in the x-z plane and concave (e.g. curving downwardly) in the y-z plane.

An inflection point is a point on a curve at which the curvature changes polarity from positive to negative or vice versa. Stated differently, an inflection point is a point on a curve at which the second derivative of the curve, or the second derivative of a function representative of the curve (e.g. a best-fit smoothly varying function), changes from positive to negative, or vice versa. The curve on which the inflection point lies may be the cross-section or profile of the surface along any given cross-sectional plane that passes through the inflection point and is perpendicular to the x-y plane.

Figure 8A:
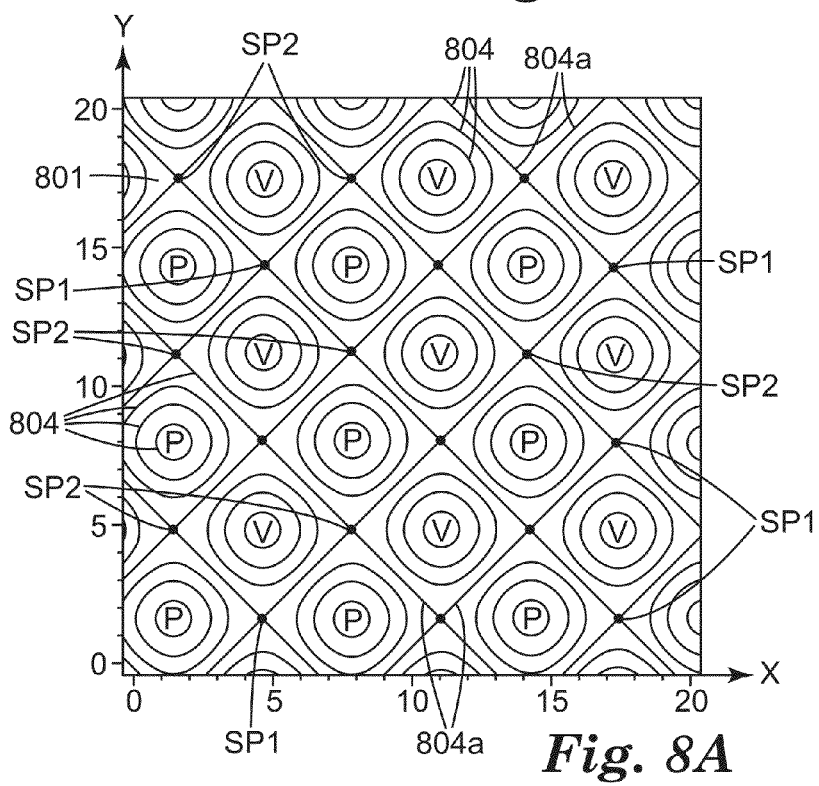
FIG. 8A is a schematic plan view of the TRS of FIG. 8, where contour lines are superimposed to show the topography, and localized peaks, localized valleys, and saddle points are also labeled.

A plan view of the surface 810, in the form of a contour map, is shown in FIG. 8A. In this view, peaks are labeled P, valleys are labeled V, and the saddle points SP from FIG. 8 are indicated with black dots. Although the saddle points are all labeled SP in FIG. 8, there are actually two different classes or types of saddle points on the surface 810, and thus in FIG. 8A we label them more specifically as SP1 or SP2. Contour lines 804 are also drawn on the surface, each contour line being a locus of points of equal elevation (having the same z-coordinate), and adjacent contour lines being indicative of a change in elevation, i.e., a slope or incline of the surface 810. In the vicinity of a peak P or a valley V, the contour lines 804 approximate concentric circles. Farther away from the peaks and valleys, the contour lines still form closed 2-dimensional shapes, but they become more square- or diamond-shaped and less circle-shaped with increasing distance from a peak or valley. Halfway between the peaks and the valleys, the contour lines 804 become straight (in this plan view) and connect to each other at the saddle points SP1, SP2 to form two intersecting sets of parallel straight lines. The straight contour lines are provided with an additional label 804a.

Figure 9:
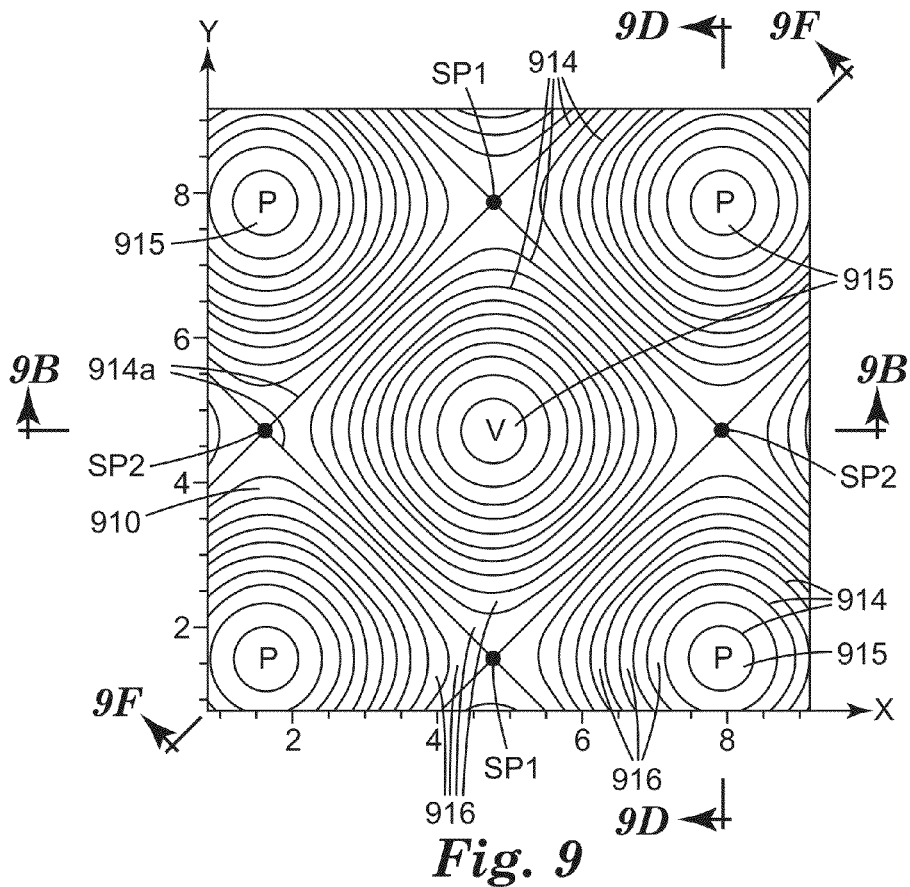
FIG. 9 is a schematic plan view of a structured surface corresponding to a portion of the TRS of FIG. 8.

The undulating surface 810 may be transformed into a structured surface of Fresnel prisms as described above. An example of the resulting Fresnel-rendered surface is shown as structured surface 910 of FIG. 9. Unlike the TRS, the structured surface 910 is segmented, grooved, or otherwise subdivided into a plurality of Fresnel prisms 916. Because of this segmentation, the overall height or thickness of the structured surface 910 is less than that of the TRS, i.e., of the surface 810. The Fresnel prisms are bounded by boundary lines 914, which may correspond substantially to the contour lines 804 of FIG. 8 except that in this particular embodiment the boundary lines 914 are made to have a finer or closer spacing than the contour lines 804. The inclined surfaces of the Fresnel prisms 916 are tailored so that the spatial distribution of directional slopes of the structured surface 910 is the same as or similar to the spatial distribution of directional slopes of the TRS. The portions of the structured surface 910 corresponding to the peaks P of the surface 810 are also labeled P, and the portions of the structured surface 910 corresponding to the valleys V of the surface 810 are also labeled V. As an approximation, for manufacturing simplicity, the regions P and V on surface 910 can be made to be flat rather than slightly curved as in the case of the counterpart portions P (which are slightly concave) and V (which are slightly convex) on surface 810. Such regions are shown as flat portions 915 in FIG. 9.

Similar to the contour lines 804 in FIG. 8A, the boundary lines 914 (and the Fresnel prisms 916 which they bound) approximate concentric circles in the vicinity of the flat portions 915, and become more square- or diamond-shaped and less circle-shaped with increasing distance from such portions 915. Halfway between neighboring flat portions 915, the boundary lines 914 become straight and connect to each other at points that are highlighted with black dots in FIG. 9. These black dots correspond to the saddle points on the surface 810, and are thus likewise labeled SP1 and SP2 for saddle point. The straight boundary lines are provided with the additional label 914a to differentiate them from the other boundary lines 914.

Figure 9A:
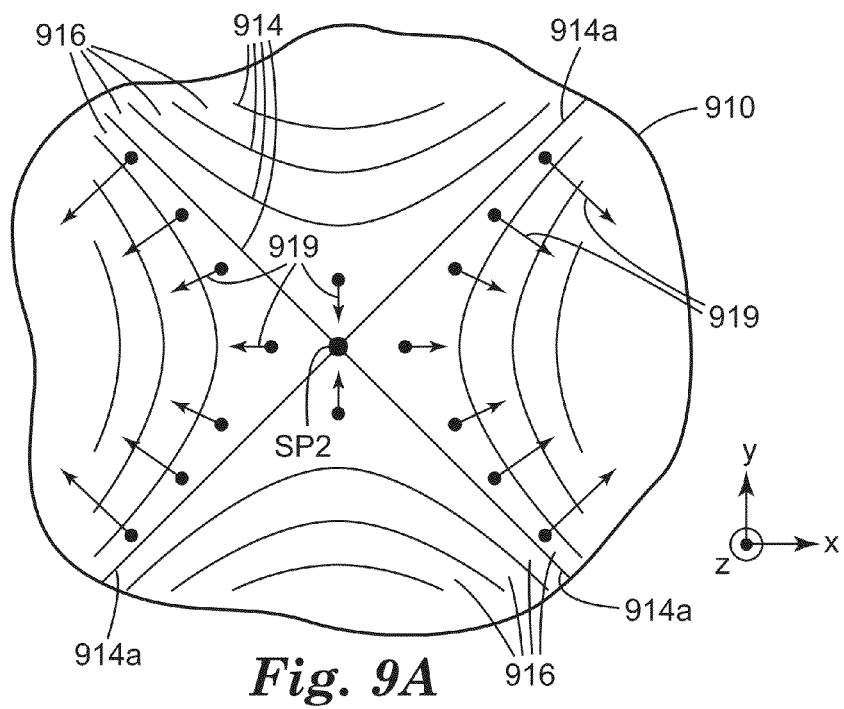
FIG. 9A is a close-up schematic plan view of a portion of the surface in FIG. 9 in the vicinity of a saddle point, where arrows representing surface normal vectors are superimposed on several of the Fresnel prisms to illustrate how the directional slope changes as a function of position.

A close-up view of a portion of the surface 910 in the vicinity of a saddle point SP2 is shown in FIG. 9A. In this view, boundary lines 914 (including some straight boundary lines 914a), Fresnel prisms 916, and a saddle point SP2 can be seen. Also included in this view are arrows that represent surface normal vectors for the four Fresnel prisms 916 that are adjacent to the saddle point SP2. These four Fresnel prisms have boundaries that include the straight boundary lines 914a. The arrows illustrate the orientation of directional slopes adjacent to the saddle point SP2, as well as how the directional slope changes along the length or path of two of the Fresnel prisms 916. In reference to the perspective of FIG. 9A, the Fresnel prisms 916 immediately above and below the saddle point SP2 have inclined surfaces near the saddle point whose surface normal vectors have components in the x-y plane which point toward the saddle point SP2. Stated differently, a cross-section of the surface 910 along a plane parallel to the y-z plane and passing through the saddle point SP2 would show that the inclined surfaces of those Fresnel prisms (near the saddle point) are both inclined towards the saddle point, thus producing a convex slope sequence.

In contrast to this, the Fresnel prisms 916 immediately to the left and right (in reference to the perspective of FIG. 9A) of the saddle point SP2 have inclined surfaces near the saddle point whose surface normal vectors have components in the x-y plane which point away from the saddle point SP2. Stated differently, a cross-section of the surface 910 along a plane parallel to the x-z plane and passing through the saddle point SP2 would show that the inclined surfaces of those Fresnel prisms (near the saddle point) are both inclined away from the saddle point, thus producing a concave slope sequence.

Figure 9B:
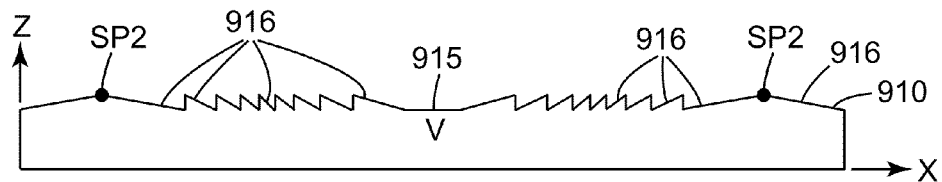
FIGS. 9B, 9D, and 9F are schematic cross-sectional views through cut lines 9B-9B, 9D-9D, and 9F-9F respectively in FIG. 9.
Figure 9C:
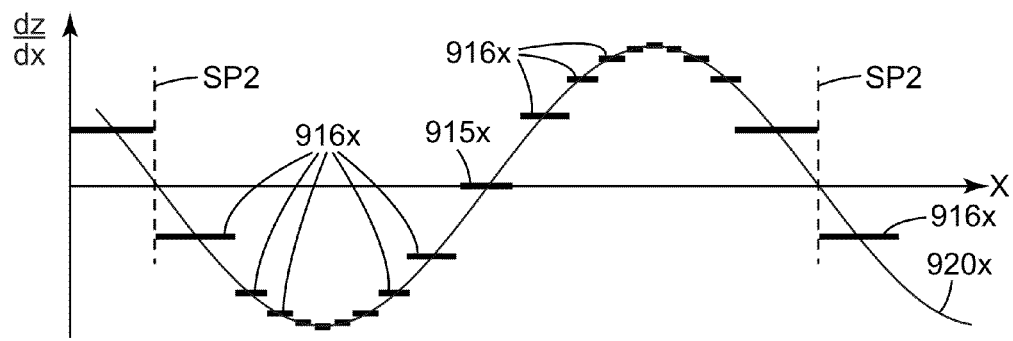
FIGS. 9C, 9E, and 9G are graphs that show the slope sequences of the (non-vertical) facets that make up the structured surfaces of FIGS. 9B, 9D, and 9F, respectively.
Figure 9D:
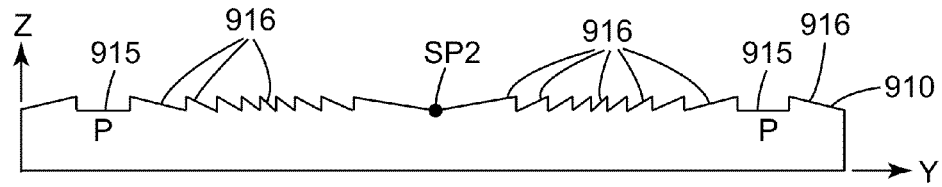
Figure 9E:
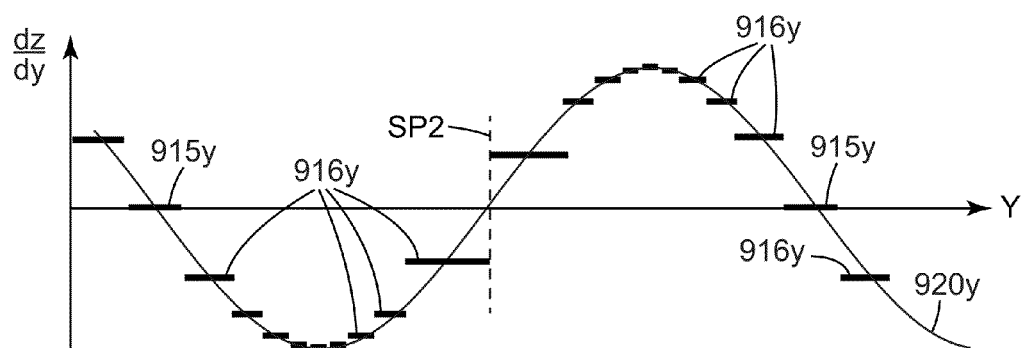
Figure 9F:
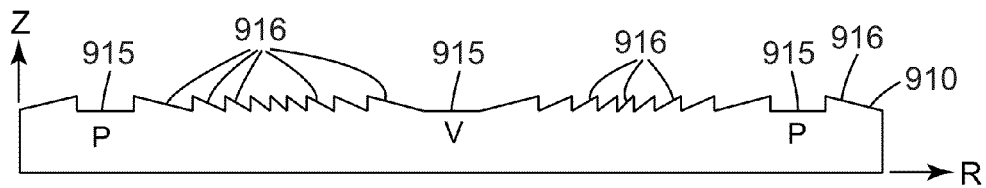

The inclined surfaces of the Fresnel prisms and their respective slopes and slope sequences can be better understood in connection with FIGS. 9B through 9G. FIGS. 9B, 9D, and 9F show cross-sectional views of the surface 910 through cut lines 9B-9B, 9D-9D, and 9F-9F (see FIG. 9), respectively. Cut line 9B-9B is parallel to the x-z plane and passes through two saddle points SP2 and one valley V. Cut line 9D-9D is parallel to the y-z plane and passes through two peaks P and one of same saddle points SP2 as cut line 9B-9B. Cut line 9F-9F is oblique to the x- and y-axes, and passes through two peaks P and the valley V of cut line 9B-9B, and no saddle points. In FIGS. 9B, 9D, and 9F, the Fresnel prisms 916 are labeled and their inclined facets can be plainly seen. The flat portions 915 associated with both the peaks P and the valleys V can also be plainly seen. The saddle points are also labeled in FIGS. 9B and 9D in a consistent fashion with FIG. 9.

Half of the saddle points on the surface 810 (FIGS. 8 and 8A) are characterized by a concave shape (downwardly curved) parallel to the x-z plane and a convex shape (upwardly curved) parallel to the y-z plane. Such saddle points, labeled SP2, are those that are disposed in cross-sectional planes that are parallel to the x-z plane and that pass through a row of valleys V. The remaining half of the saddle points SP on the surface 810 are characterized oppositely, i.e., by a convex shape parallel to the x-z plane and a concave shape parallel to the y-z plane. Such saddle points, labeled SP1, are those that are disposed in cross-sectional planes that are parallel to the x-z plane and that pass through a row of peaks P. Similarly with regard to the structured surface 910, half of its saddle points are characterized by a slope sequence of the Fresnel prism inclined facets that is concave parallel to the x-z plane and convex parallel to the y-z plane. These saddle points, labeled SP2, are the ones that are disposed in cross-sectional planes that are parallel to the x-z plane and that pass through a row of valleys V. (Two such saddle points SP2 are shown in the cross-sectional view of FIG. 9B, and one of these same saddle points SP2 is shown in the cross-sectional view of FIG. 9D, and depicted in the plan view of FIG. 9A.) The remaining half of the saddle points on the surface 910 are characterized by a slope sequence of the Fresnel prism inclined facets that is convex parallel to the x-z plane and concave parallel to the y-z plane. These saddle points, labeled SP1, are the ones that are disposed in cross-sectional planes that are parallel to the x-z plane and that pass through a row of peaks P.

As noted above, the saddle points SP2 appearing in the cross-sectional views of FIGS. 9B and 9D are of the type whose slope sequence is concave parallel to the x-z plane (FIG. 9B) and convex parallel to the y-z plane (FIG. 9D). Thus, in FIG. 9B, the Fresnel prisms 916 that are adjacent to either one of the depicted saddle points SP2 have inclined facets that are inclined away from the saddle point SP2 to produce a concave (downwardly curved) feature. In contrast, in FIG. 9D, the Fresnel prisms 916 that are adjacent to the depicted saddle point SP2 (which is the same as the saddle point SP2 on the right side of FIG. 9B) have inclined facets that are inclined towards the saddle point SP to produce a convex (upwardly curved) feature.

Figure 9G:
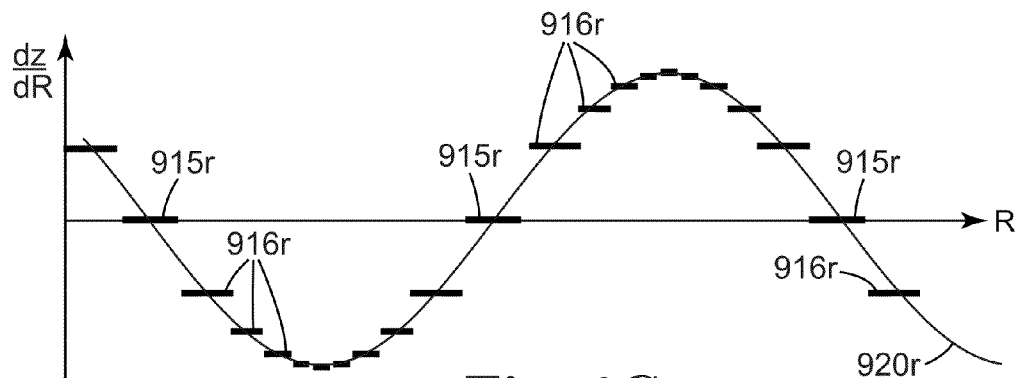

Further information and insight about the orientation and arrangement of the Fresnel prisms 916 on the structured surface 910 can be seen in FIGS. 9C, 9E, and 9G. These figures plot the first derivative or slope of the structured surface 910 (ignoring any vertical facets of Fresnel prisms) as a function of position along the relevant cross-sectional plane. Thus, FIG. 9C plots such first derivative information (dz/dx) as a function of position along the x-direction for the cut line 9B-9B of FIG. 9 (the cross-sectional view of FIG. 9B). FIG. 9E plots such first derivative information (dz/dy) as a function of position along the y-direction for the cut line 9D-9D of FIG. 9 (the cross-sectional view of FIG. 9D). FIG. 9G plots such first derivative information (dz/dR, where R=sqrt($x^2$+$y^2$)) as a function of position along a diagonal direction for the cut line 9F-9F of FIG. 9 (the cross-sectional view of FIG. 9F). The first derivative information in the graphs of these FIGS. 9C, 9E, and 9G appears as a sequence of horizontal line segments, these line segments having a one-to-one correspondence with the inclined facets of the Fresnel prisms 916 in the associated cross-sectional profile of the surface 910, as well as any other non-vertical portions of the surface 910 such as flat portions 915. The zero slope associated with the flat portions 915 (for the peaks P and the valleys V) can be readily identified in these figures. In FIGS. 9C and 9E, positions corresponding to saddle points are indicated with a dashed vertical line labeled SP2.

The characteristic of a saddle point wherein the surface has curvatures of opposite polarity along orthogonal cross-sectional planes can be appreciated by a comparison of FIGS. 9C and 9E. In FIG. 9E, the depicted saddle point SP2 is at a location where the slope along the positive y-direction changes from negative to positive. In FIG. 9C, this same saddle point SP2 (see the saddle point at the right side of FIG. 9C) is at a location where the slope along the positive x-direction changes in the opposite way, i.e., from positive to negative.

Second derivative characteristics of the structured surface 910 can also be analyzed. In the case of Fresnel prisms 916 whose inclined surfaces are straight or planar, their first derivatives are flat (horizontal) line segments as seen in FIGS. 9C, 9E, and 9G. If the further derivative of those line segments is then calculated (and ignoring discontinuities between adjacent line segments), the result will be an uninteresting and uninformative flat line. In such cases, a more informative second derivative of the structured surface (in a cross-sectional plane of interest) can be obtained by replacing the actual first derivative of the surface, e.g. as shown by the step-wise horizontal line segments in FIGS. 9C, 9E, and 9G, with a continuous first derivative function that approximates the original step-wise first derivative function. The continuous first derivative function may for example be piecewise linear, and made by simply connecting the centers of each of the horizontal line segments of the original first derivative function. Alternatively, the continuous derivative function may be a smoothly varying curve that accurately or best fits the original first derivative function. For each of the original first derivative functions shown in FIGS. 9C, 9E, and 9G, simple sinusoidal functions can be determined which pass through the centers of each of the horizontal line segments. These sinusoidal functions, labeled 920x, 920y, and 920r, respectively, are suitable for use as continuous first derivative functions (approximations of their respective original first derivative functions) from which second derivatives, as well as higher order derivatives, may be calculated, e.g. for the purpose of identifying inflection points.

Figure 10:
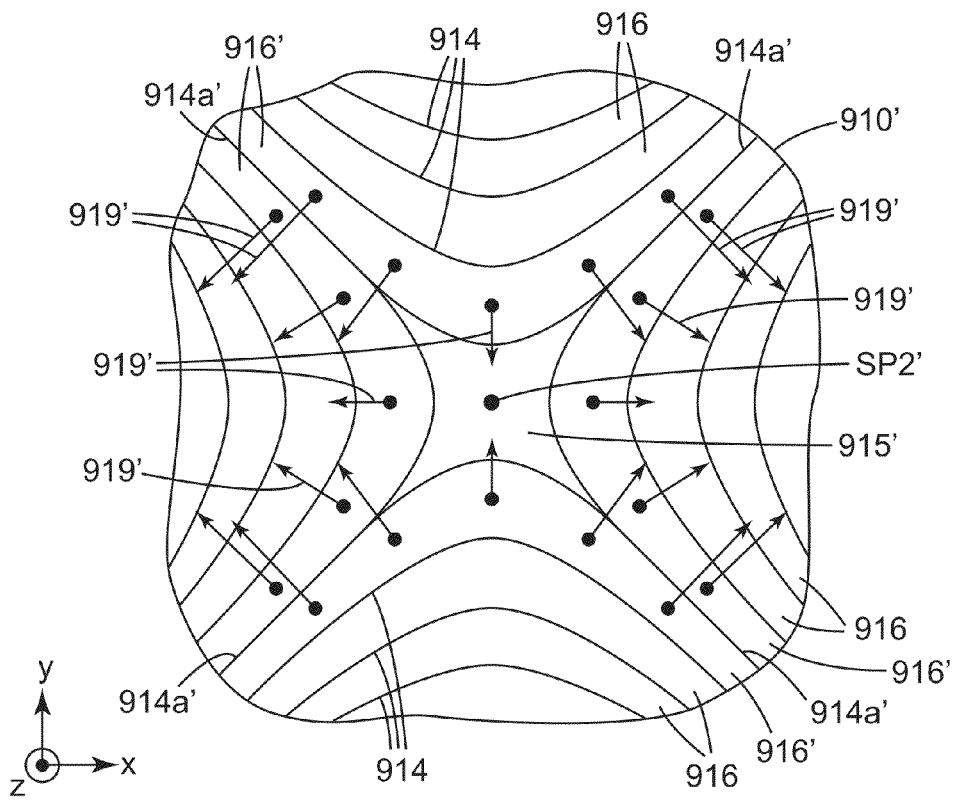
FIG. 10 is a schematic plan view of a portion of a structured surface in an alternative embodiment to that of FIGS. 9 and 9A.

Numerous modifications and adaptations of the Fresnel-rendered surface can be made while still substantially approximating or mimicking the 3-dimensional nature of the TRS as embodied or encoded in its spatial distribution of directional slopes. In one such example, the structured surface 910 described above can be modified selectively in the vicinity of the saddle points SP so as to remove the sharp corners that can be seen in plan view for each outermost Fresnel prism 916 in each set of concentric Fresnel prisms 916 which surround any given peak P or valley V region (see flat portions 915). Stated differently, the sharp corners created at the intersections of the straight boundary lines 914a at the saddle points SP can be eliminated by flattening or otherwise re-shaping a small portion of the structured surface 910 in the vicinity of each saddle point SP. Such a modification to the structured surface 910 is shown in FIG. 10, where the modified structured surface is labeled 910'. Many or most of the features described above in connection with structured surface 910, including e.g. the flat portions 915, and most of the Fresnel prisms 916, and most of the boundary lines 914, may be the same or substantially the same in the surface 910', and thus are given the same labels in FIG. 10. The straight boundary lines 914a may also be mostly preserved in surface 910', except in the vicinity of the saddle point SP where such lines can be rounded in order to avoid a sharp corners on the outermost Fresnel prisms 916, these modifications resulting in the modified boundary lines 914a' and the modified outermost Fresnel prisms 916' shown in the plan view of FIG. 10. The rounding of the plan view paths of the Fresnel prisms 916' and of the boundary lines 914a' introduces a newly modified portion of the structured surface 910' at which the (modified) saddle point SP' is located, such newly modified portion being shown in this particular embodiment as a new flat portion 915'. This modification can be made at one, some, or all of the original saddle points SP on the original structured surface 910. By making the modification at all of the saddle points, the modified structured surface 910' can be devoid of any such sharp corners, and the tool from which it is replicated can be more easily manufactured.

In FIG. 10, arrows are provided in similar fashion to FIG. 9A to represent surface normal vectors for the four Fresnel prisms 916' that are adjacent to the saddle point SP'. These four Fresnel prisms have boundaries that include the boundary lines 914a'. The arrows illustrate the orientation of directional slopes adjacent to the saddle point SP', as well as how the directional slope changes along the length or path of the four illustrated Fresnel prisms 916'. Similar to FIG. 9A, the saddle point SP' of FIG. 10 has inclined surfaces of adjacent Fresnel prisms that are inclined towards the saddle point along a plane parallel to the y-z plane, producing a convex slope sequence, and the same saddle point SP' has inclined surfaces of adjacent Fresnel prisms that are inclined away from the saddle point along a plane parallel to the x-z plane, producing a concave slope sequence.

Figure 11:
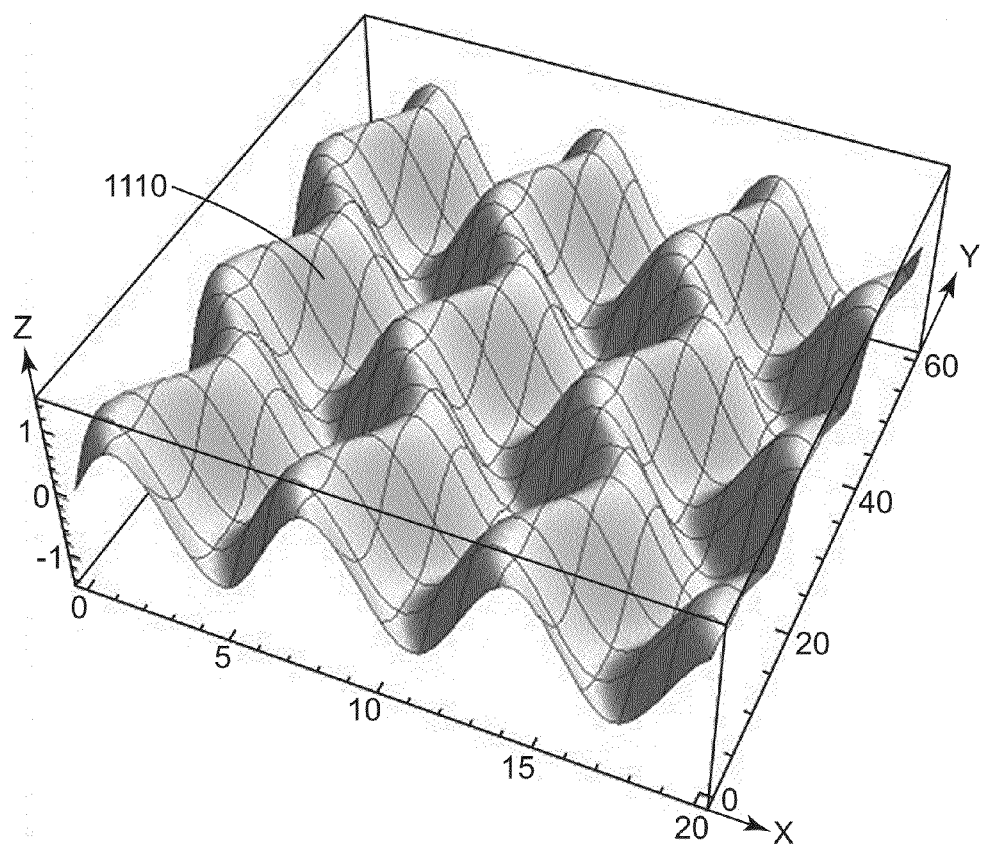
FIG. 11 is a schematic perspective view of a topographical reference surface (TRS) having features that undulate in plan view and having a slope sequence that defines one or more inflection points.

Many 3-dimensional surfaces that occur in nature are not strictly unidirectional. The ridge of a 3-dimensional surface may "wander" in the x-y plane, or the ridge may increase or decrease in elevation along its length. A linear sine wave, or otherwise linear "tin roof" corrugated surface can be modified to make it more interesting by tailoring the ridges and valleys to wander in a sinusoidal or other oscillatory fashion in the x-y plane. A perspective view of such a surface, which has a complex topography and which we refer to as a TRS, is shown in FIG. 11. In this figure, the surface 1110 extends generally parallel to the x-y plane, but it undulates sinusoidally in the x-z plane, and each ridge (peak) and valley also wanders in an oscillating fashion in the x-y plane. Two intersecting sets of uniformly spaced grid lines are again drawn on the surface for illustrative purposes so that the 3-dimensional shape of the surface can be better visualized. For this particular embodiment, the height or z-coordinate of any point on the surface 1110 is related to the (x,y) coordinates of such point by the function $$z=0.8*\sin(x+\sin(0.3*y)).$$

Figure 11A:
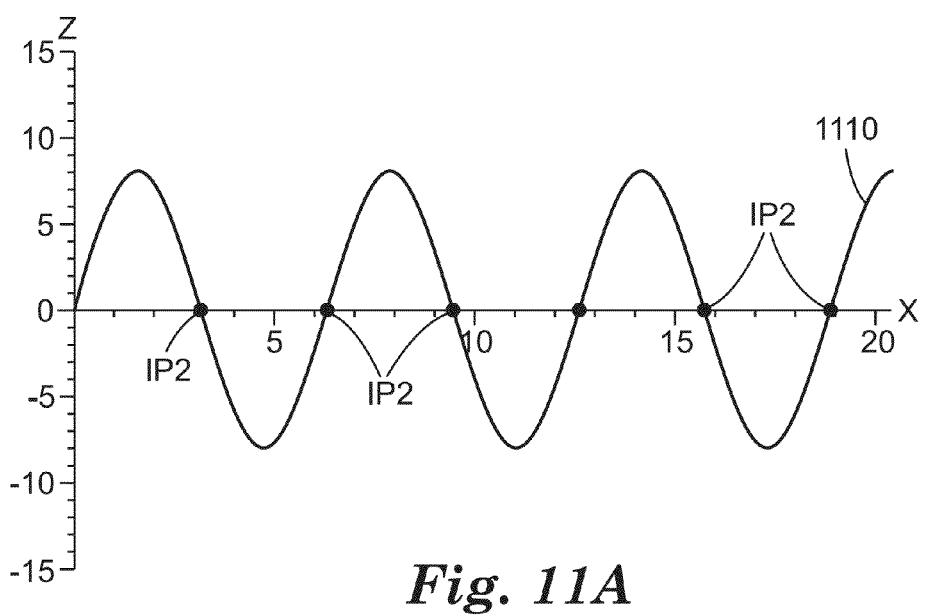
FIG. 11A is a schematic side or cross-sectional view of the TRS of FIG. 11 in the x-z plane.

The resulting surface 1110 actually provides two different types of inflection points. A first type is associated with the oscillatory plan-view shape or path of each ridge, valley, or portion of intermediate elevation. Any such path in plan view defines points or regions at which the curvature of the path changes polarity from positive to negative or vice versa, or at which the second derivative of the path changes from positive to negative, or vice versa. A second type of inflection point embodied in the surface 1110 is associated with the shape of the surface 1110 along a given cross-sectional plane. For example, the shape of the surface 1110 along any cross-sectional plane parallel to the x-z plane is sinusoidal. FIG. 11A shows the cross-sectional shape of the surface 1110 along the x-z plane itself. The inflection points for this curve are labeled 1P2. Additional inflection points of the second type also exist on cross-sections of the surface 1110 along planes that are not parallel to the x-z plane, e.g., along planes that parallel to the y-z plane, and planes that are perpendicular to the x-y plane but disposed at oblique angles to the x-z and y-z planes. All of the first and second types of inflection points that exist on the TRS (surface 1110) will also typically exist on the associated Fresnel-rendered structured surface, to the extent it accurately approximates or mimics the spatial distribution of directional slopes of the TRS.

Figure 12:
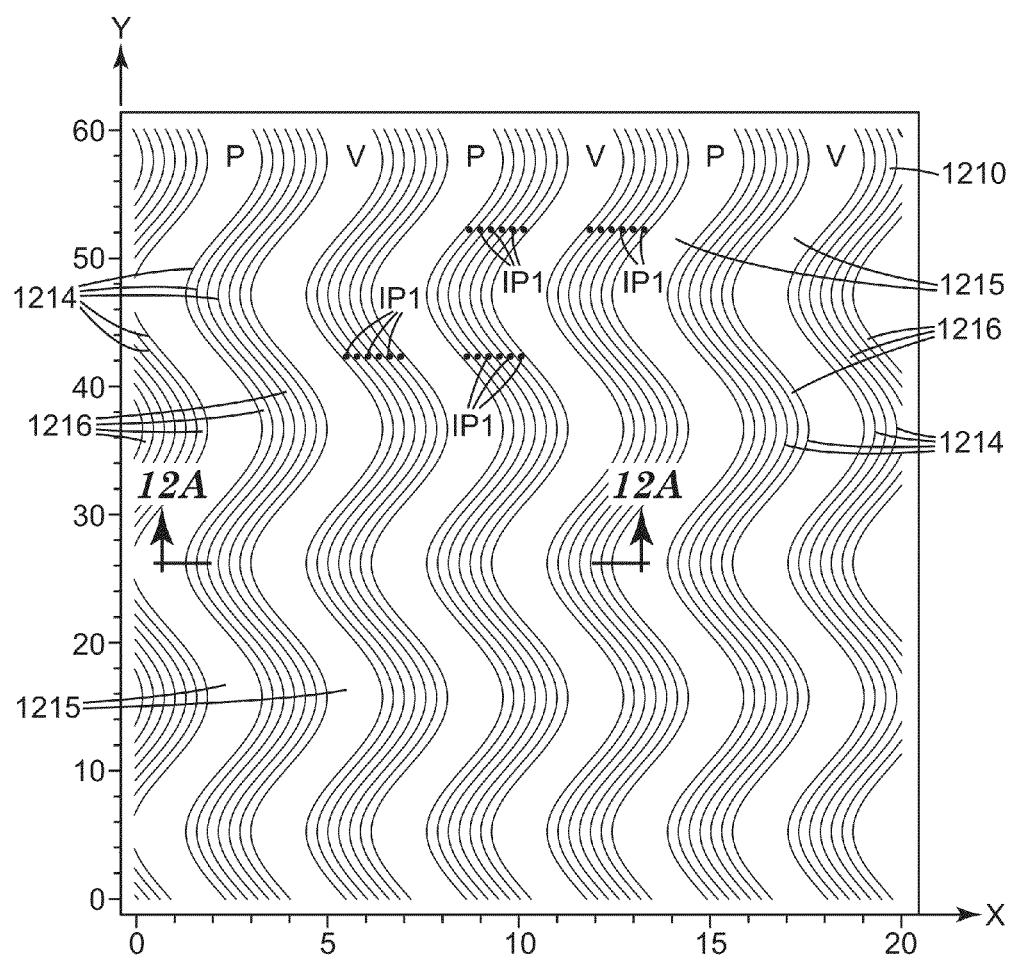
FIG. 12 is a schematic plan view of a structured surface corresponding to the TRS of FIG. 11.

One embodiment of a Fresnel-rendered structured surface 1210 corresponding to the TRS of FIG. 11 is shown schematically in FIG. 12. Unlike the TRS, the structured surface 1210 is segmented, grooved, or otherwise subdivided into a plurality of Fresnel prisms 1216. Because of this segmentation, the overall height or thickness of the structured surface 1210 is less than that of the TRS, i.e., of the surface 1110. The Fresnel prisms are bounded by boundary lines 1214, which may correspond substantially to contour lines of the surface 1110. The inclined surfaces of the Fresnel prisms 1216 are tailored so that the spatial distribution of directional slopes of the structured surface 1210 is the same as or similar to the spatial distribution of directional slopes of the TRS. The portions of the structured surface 1210 corresponding to the peaks P of the surface 1110 are also labeled P, and the portions of the structured surface 1210 corresponding to the valleys V of the surface 1110 are also labeled V. As an approximation, for manufacturing simplicity, the regions P and V on surface 1210 can be made to be flat rather than slightly curved as in the case of the counterpart portions P (which are slightly concave) and V (which are slightly convex) on surface 1110. Such regions are shown as flat portions 1215 in FIG. 12.

In the plan view of FIG. 12, it is possible to identify inflection points associated with the in-plane path or shape of each prism 1216, which were referred to in the above discussion as the first type of inflection points. Some of these inflection points are identified and labeled as IP1 in FIG. 12.

Figure 12A:
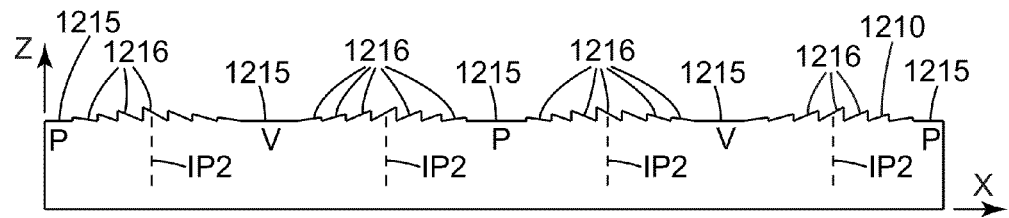
FIG. 12A is a schematic cross-sectional view through cut line 12A-12A of FIG. 12.

The inclined surfaces of the Fresnel prisms and their respective slopes and slope sequences can be better understood in connection with FIG. 12A, which shows a cross-sectional view of the surface 1210 through the cut line 12A-12A. In FIG. 12A, the Fresnel prisms 1216 are labeled and their inclined facets can be plainly seen. The flat portions 1215 associated with both the peaks P and the valleys V can also be plainly seen. For the particular cut line 12A-12A selected, the cut line does not pass through any of the first type of inflection points. However, the surface 1210 in this cross-sectional plane does define some inflection points of the second type. These are identified with the labels 1P2 in FIG. 12A.

Figure 12B:
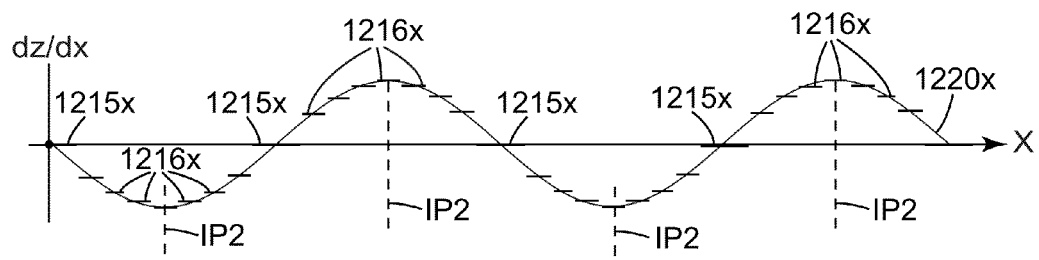
FIG. 12B is a graph showing the slope sequences of the facets that make up the structured surface of FIG. 12A.

Further information and insight about the orientation and arrangement of the Fresnel prisms 1216 on the structured surface 1210 can be seen in FIG. 12B. This figure plots the first derivative or slope of the structured surface 1210 (ignoring any vertical facets of Fresnel prisms) as a function of position along the cross-sectional plane. Thus, FIG. 12B plots such first derivative information (dz/dx) as a function of position along the x-direction for the cut line 12A-12A of FIG. 12 (the cross-sectional view of FIG. 12A). As seen in previous figures, the first derivative information in the graph of FIG. 12B appears as a sequence of horizontal line segments, these line segments having a one-to-one correspondence with the inclined facets of the Fresnel prisms 1216 in the associated cross-sectional profile of the surface 1210, as well as any other non-vertical portions of the surface 1210 such as flat portions 1215. The zero slope associated with the flat portions 1215 (for the peaks P and the valleys V) can be readily identified in the figure. In FIGS. 12A and 12B, positions corresponding to inflection points (of the second type) are indicated with a dashed vertical line labeled 1P2.

In accordance with the discussion above, the second derivative characteristics of the structured surface 1210 can also be analyzed using a continuous first derivative function that approximates the original step-wise first derivative function shown in FIG. 12B. The continuous first derivative function may for example be piecewise linear, or may be a smoothly varying curve that accurately or best fits the original first derivative function. For the original first derivative function shown in FIG. 12B, a simple sinusoidal function 1220x can be determined which passes through the centers of each of the horizontal line segments. This sinusoidal function is suitable for use as a continuous first derivative function from which the second derivative, as well as higher order derivatives, may be calculated, e.g. for the purpose of identifying inflection points. Note that inflection points (whether of the first or second type) can of course exist on curves or functions that undulate in a non-sinusoidal manner.

Figure 13:
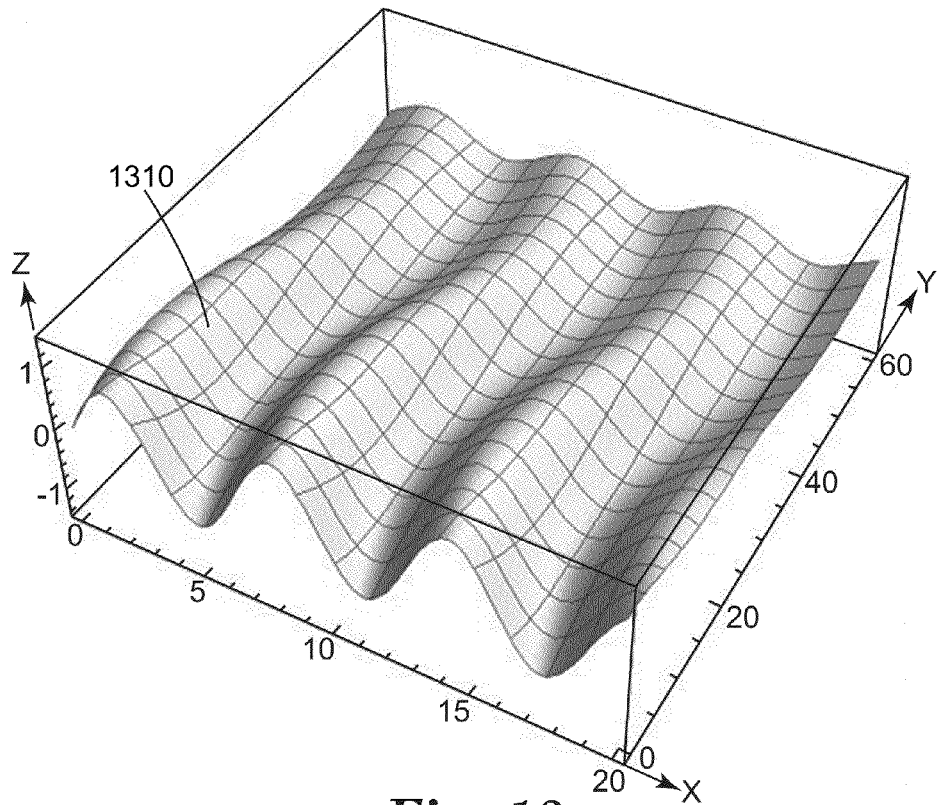
FIG. 13 is a schematic perspective view of another topographical reference surface (TRS) having features that undulate in plan view and having a slope sequence that defines one or more inflection points.

As mentioned above, numerous modifications can be made to the disclosed embodiments. One modification of the TRS 1110 of FIG. 11 is shown in FIG. 13. In FIG. 13, a surface 1310 is shown that is similar to surface 1110 insofar as it has a complex topography, with undulating features in plan view and with inflection points of both the first and second type. The peaks (ridges) and valleys of the surface 1310 have a similar wavy-appearance in plan view to those of FIG. 11, but in the case of surface 1310, the height or elevation of the peaks, as well as the height or elevation of the valleys, changes along their respective plan-view paths. The surface 1310 extends generally parallel to the x-y plane, but it undulates sinusoidally in the x-z plane, and each ridge (peak) and valley also wanders or undulates in an oscillating fashion in the x-y plane. Two intersecting sets of uniformly spaced grid lines are again drawn on the surface for illustrative purposes so that the 3-dimensional shape of the surface can be better visualized. For this particular embodiment, the height or z-coordinate of any point on the surface 1310 is related to the (x,y) coordinates of such point by the function $$z = 0.8 * \sin(x + \sin(0.1 * y)) * \left(\frac{60}{60 + 2.5y}\right),$$

where the function is plotted in FIG. 13 between the limits of 0≤x≤20 and 0≤y≤60.

Figure 14:
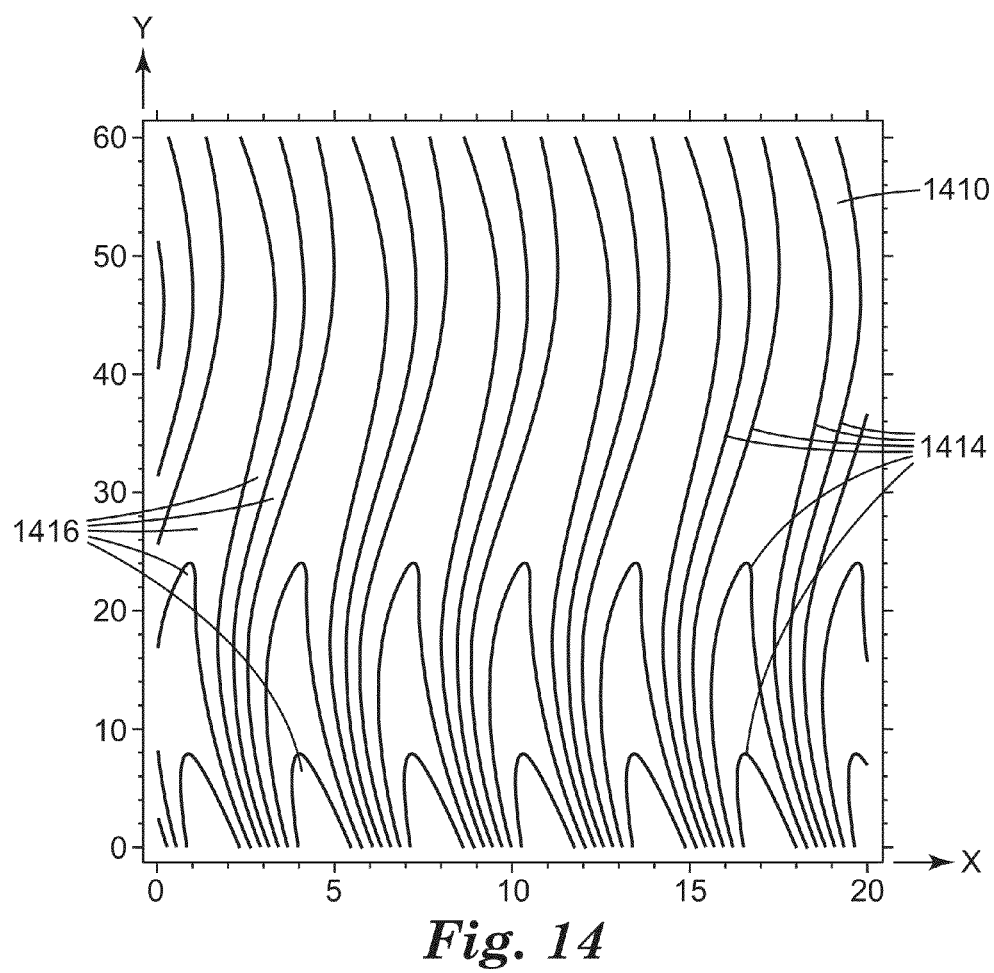
FIG. 14 is a schematic plan view of a structured surface corresponding to the TRS of FIG. 13, the structured surface comprising Fresnel prisms that undulate in plan view and have a slope sequence that defines multiple inflection points.

This surface 1310 also provides two different types of inflection points, referred to above as first type and second type. The first type is associated with the oscillatory plan-view shape or path of each ridge, valley, or portion of intermediate elevation. Any such path in plan view defines points or regions at which the curvature of the path changes polarity from positive to negative or vice versa, or at which the second derivative of the path changes from positive to negative, or vice versa. This curvature and undulation can be better seen in the plan view of FIG. 14 of a structured surface 1410 which is a Fresnel-rendering of the TRS 1310. Unlike the TRS 1310, the structured surface 1410 is segmented, grooved, or otherwise subdivided into a plurality of Fresnel prisms 1416. Because of this segmentation, the overall height or thickness of the structured surface 1410 is less than that of the TRS, i.e., of the surface 1310. The Fresnel prisms are bounded by boundary lines 1414, which may correspond substantially to contour lines of the surface 1310. The inclined surfaces of the Fresnel prisms 1416 are tailored so that the spatial distribution of directional slopes of the structured surface 1410 is the same as or similar to the spatial distribution of directional slopes of the TRS.

The second type of inflection point embodied in the surface 1310, as well as the surface 1410, is associated with the shapes of these surfaces along a given cross-sectional plane, e.g., along the x-z plane. The shape of the surface 1310 along this plane is sinusoidal, and the slope sequence of the surface 1410 along this plane also defines a substantially sinusoidal function. As such, inflection points of the second type (not labeled in FIG. 13 or 14) will be present in such cross-sectional shapes, in an analogous fashion to those shown and described in connection with FIGS. 11 through 12B.

Films and other optical bodies having the disclosed structured surfaces can be made in any suitable fashion using known manufacturing techniques. For example, the films and bodies can be made with structured surface tools, the tool having a negative or inverted topography relative to that desired in the finished product. The structured surface layer of such film or body may be embossed or cast against the structured surface of the tool to impart the desired geometry of the Fresnel prisms and optional flat surfaces. The structured surface of the tool and/or the optical body can be fabricated in any suitable fashion, e.g. by etching, scribing, and/or other suitable means, such as gray scale lithography, 3D printing, and/or diamond machining.

If desired, the inclined facets of some or all of the Fresnel prisms on the structured surface of the optical body can be made partially or completely reflective by applying a reflective material such as a thin coating of aluminum, silver, or other reflective metal or other material, and thus may transmit and refract some incident light or no incident light.

Some or all of the layers of the finished optical body or film may be polymer-based such that the article, or one or more components thereof, can be manufactured on a conventional film line with conventional polymer based materials. Alternatively or in addition, the article can be made with other known processes and equipment, and may comprise non-polymeric materials, such as glasses, ceramics, metals, and/or other suitable materials. Further discussion of materials is provided below.

In some embodiments, the disclosed optical bodies can comprise thin polymer-based layers that are laminated, coextruded, and/or coated such that the article is self-supporting, flexible, and conformable to a target surface or object. In this regard, the disclosed articles may be configured such that a front or back major surface of the article attaches to a wall or other object of interest, and light enters and exits through opposite surfaces of the article, or through a same surface of the article. The disclosed articles may include additional layers and coatings to facilitate such applications, including e.g. planarization layer(s), adhesive layer(s), release liner(s), hard coat(s), and the like. The disclosed optical bodies can also in some cases be made with a transparent base film or substrate such that decorative reflective images or patterns can be viewed from both sides (opposite sides) of the film. The films can be applied to windows or similar light-transmissive substrates, such as an interior office window, so that decorative images or patterns provided by the Fresnel prisms can be viewed from both sides of the combination. Different indicia or color films can be applied to opposing sides of the film such that the window has a distinctly different appearance from each side. Colored and/or neutral gray dyes, pigments, and the like can be incorporated into one or more of the constituent layers (such as an indicia layer) of, or can be included as an additional colored or tinted layer in, any of the disclosed film or film stack embodiments, for further visual effect. A film, film laminate, or other optical body may have only one major surface that is Fresnel-rendered to provide Fresnel prisms as described herein, but in other cases two or more major surfaces of the film, film laminate, or other optical body can be Fresnel-rendered in that manner. If multiple Fresnel-rendered structured surfaces are used, they may be on different layers of a laminate, and they may be identical to each other, or of different designs or patterns, and they may be aligned with each other or misaligned. One or more light-diffusing layers or agents can also be included in any of the disclosed embodiments. Reflective color films such as multilayer interference films can provide striking visual effects when combined with the Fresnel lens and mirror films. Narrow band color mirror films, examples of which can be found in U.S. Pat. No. 6,531,230 (Weber et al.), "Color Shifting Film", may be particularly suitable. The disclosed articles may be made of any suitable materials now known or later developed, including materials other than polymer-based films. The articles may include one or more thick and/or rigid and/or brittle component such that the resulting article is rigid rather than flexible.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Any direction referred to herein, such as "top," "bottom," "left," "right," "upper," "lower," "above," "below," and other directions and orientations are used for convenience in reference to the figures and are not to be limiting of an actual device, article, or system or its use. The devices, articles, and systems described herein may be used in a variety of directions and orientations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

This document discloses numerous embodiments, including but not limited to the following:

Item 1 is an optical body comprising a structured surface comprising a plurality of Fresnel prisms comprising a first and second Fresnel prism;
  wherein the first and second Fresnel prisms have elongated first and second plan view shapes respectively, and in a first region the first and second shapes follow paths that track each other; and
  wherein in a second region the first and second shapes follow paths that diverge from each other.

Item 2 is the optical body of item 1, wherein the plurality of Fresnel prisms also comprises a third Fresnel prism, and wherein the third Fresnel prism is not present in the first region but is disposed between the first and second Fresnel prisms in the second region.

Item 3 is the optical body of item 2, wherein the third Fresnel prism has a third plan view shape that is concave in the second region.

Item 4 is the optical body of item 3, wherein the third plan view shape is U-shaped.

Item 5 is the optical body of item 1, wherein in the first region the first and second shapes follow paths that are parallel to each other.

Item 6 is the optical body of item 1, wherein in the first region the first and second shapes follow paths that are adjacent to each other.

Item 10 is the optical body of item 1, wherein the first Fresnel prism has a slope and/or width that changes along a length of the first Fresnel prism.

Item 14 is the optical body of item 1, wherein the first and second Fresnel prisms form a wye.

Item 15 is an optical body comprising a structured surface comprising a plurality of Fresnel prisms, wherein at least some (e.g. at least two or at least three) of the Fresnel prisms are configured to form a wye.

Item 16 is the optical body of item 15, wherein the plurality of Fresnel prisms includes a first and second Fresnel prism having first and second plan view shapes respectively, and in a first region the first and second shapes follow paths that track each other, and in a second region the first and second shapes follow paths that diverge from each other.

Item 17 is an optical body comprising a structured surface comprising a plurality of Fresnel prisms, wherein the Fresnel prisms are configured such that slopes of the Fresnel prisms define at least a first saddle point.

Item 18 is the optical body of item 17, wherein the slopes of the Fresnel prisms form a first slope sequence along a first cross-sectional plane that intersects the first saddle point, and a second slope sequence along a second cross-sectional plane that intersects the first saddle point, the first slope sequence being concave and the second slope sequence being convex.

Item 19 is the optical body of item 17, wherein the slopes of the Fresnel prisms define a plurality of saddle points which includes the first saddle point.

Item 20 is the optical body of item 17, wherein the plurality of saddle points are in a regular repeating array.

Item 28 is an optical body comprising a structured surface comprising a plurality of Fresnel prisms comprising a first Fresnel prism;
  wherein the Fresnel prisms are arranged in a slope sequence, the slope sequence defining one or more inflection points; and
  wherein the first Fresnel prism has a first prism shape in plan view that includes an undulating portion.

Item 29 is the optical body of item 28, wherein the first Fresnel prism has a slope and/or a width that changes along a length of the first Fresnel prism.

Item 30 is the optical body of item 29, wherein the first Fresnel prism has a slope that changes along the length of the first Fresnel prism.

Item 31 is the optical body of item 29, wherein the first Fresnel prism has a width that changes along the length of the first Fresnel prism.

Item 38 is the optical body of item 28, wherein the undulating portion of the first prism shape comprises an inflection point.

Item 39 is an optical body comprising a structured surface comprising a plurality of Fresnel prisms comprising a first Fresnel prism, the first Fresnel prism having a first prism shape in plan view that includes an inflection point.

Item 40 is the optical body of item 39, wherein the Fresnel prisms are arranged in a slope sequence in a cross sectional plane, the slope sequence defining one or more inflection points.

Item 41 is the optical body of item 39, wherein the first prism shape undulates and includes a plurality of inflection points.

Item 42 is the optical body of any other numbered item, wherein the Fresnel prisms are light transmissive and refractive.

Item 43 it the optical body of any other numbered item, wherein the Fresnel prisms are reflective.

Item 44 is the optical body of any other numbered item, wherein the structured surface provides a 3-dimensional appearance.

Item 45 is the optical body of any other numbered item, wherein the plurality of Fresnel prisms includes a first Fresnel prism having a slope and/or width that changes along a length of such first Fresnel prism.

Item 46 is the optical body of any other numbered item, wherein the structured surface is formed in a first material layer, and wherein the optical body further comprises a planarizing layer in mating contact with the structured surface.

Item 47 is the optical body of item 46, wherein the planarizing layer comprises a nanovoided material.

Item 48 is the optical body of any other numbered item, wherein the structured surface is formed in a first material layer, and wherein the optical body further comprises an indicia layer attached directly or indirectly to the first material layer.

The invention claimed is:

1. An optical body comprising a structured surface comprising a plurality of Fresnel prisms comprising a first and second Fresnel prism;
  wherein the first and second Fresnel prisms have elongated first and second plan view shapes respectively, and in a first region the first and second shapes follow paths that track each other;
  wherein in a second region the first and second shapes follow paths that diverge from each other; and
  wherein the plurality of Fresnel prisms also comprises a third Fresnel prism, and wherein the third Fresnel prism is not present in the first region but is disposed between the first and second Fresnel prisms in the second region.

2. The optical body of claim 1, wherein the third Fresnel prism has a third plan view shape that is concave in the second region.

3. The optical body of claim 2, wherein the third plan view shape is U-shaped.

4. The optical body of claim 1, wherein in the first region the first and second shapes follow paths that are parallel to each other.

5. The optical body of claim 1, wherein in the first region the first and second shapes follow paths that are adjacent to each other.

6. The optical body of claim 1, wherein the Fresnel prisms are light transmissive and refractive.

7. The optical body of claim 1, wherein the Fresnel prisms are reflective.

8. The optical body of claim 1, wherein the structured surface provides a 3-dimensional appearance.

9. The optical body of claim 1, wherein the first Fresnel prism has a slope and/or width that changes along a length of the first Fresnel prism.

10. The optical body of claim 1, wherein the structured surface is formed in a first material layer, and wherein the optical body limber comprises a planarizing layer in mating contact with the structured surface.

11. The optical body of claim 10, wherein the planarizing layer comprises a nanovoided material.

12. The optical body of claim 10, wherein the structured surface is formed in a first material layer, and wherein the optical body further comprises an indicia layer attached directly or indirectly to the first material layer.

13. The optical body of claim 1, wherein the first and second Fresnel prisms form a wye.

14. An optical body comprising a structured surface comprising a plurality of Fresnel prisms, wherein at least some of the Fresnel prisms are configured to form a wye, wherein the plurality of Fresnel prisms includes a first and second Fresnel prism having first and second plan view shapes respectively, and in a first region the first and second shapes follow paths that track each other, and in a second region the first and second shapes follow paths that diverge from each other.

15. An optical body comprising a structured surface comprising a plurality of Fresnel prisms, wherein the Fresnel prisms are configured such that slopes of the Fresnel prisms define at least a first saddle point, wherein the slopes of the Fresnel prisms form a first slope sequence along, a first cross-sectional plane that intersects the first saddle point, and a second slope sequence alone a second cross-sectional plane that intersects the first saddle point, the first slope sequence being concave and the second slope sequence being convex.

16. The optical body of claim 15, wherein the slopes of the Fresnel prisms define a plurality of saddle points which includes the first saddle point.

17. The optical body of claim 15, wherein the plurality of saddle points are in a regular repeating array.

18. The optical body of claim 15, wherein the Fresnel prisms are light transmissive and refractive.

19. The optical body of claim 15, wherein the Fresnel prisms are reflective.

20. The optical body of claim 15, wherein the structured surface provides a 3-dimensional appearance.

21. The optical body of claim 15, wherein the plurality of Fresnel prisms includes a first Fresnel prism having a slope and/or width that changes along a length of such first Fresnel prism.

22. The optical body of claim 15, wherein the structured surface is formed in a first material layer, and wherein the optical body further comprises a planarizing layer in mating contact with the structured surface face.

23. The optical body of claim 22, wherein the planarizing layer comprises a nanovoided material.

24. The optical body of claim 22, wherein the structured surface is formed in a first material layer, and wherein the optical body further comprises an indicia layer attached directly or indirectly to the first material layer.

25. An optical body comprising a structured surface comprising a plurality of Fresnel prisms comprising a first Fresnel prism;
   wherein the Fresnel prisms are arranged in a slope sequence, the slope sequence defining one or more inflection points;
   wherein the first Fresnel prism has a first prism shape in plan view that includes an undulating portion; and
   wherein the structured surface is firmed in a first material layer, and wherein the optical body further comprises a planarizing layer in mating contact with the structured surface.

26. The optical body of claim 25, wherein the first Fresnel prism has a slope and/or a width that changes along a length of the first Fresnel prism.

27. The optical body of claim 26, wherein the first Fresnel prism has a slope that changes along, the length of the first Fresnel prism.

28. The optical body of claim 26, wherein the first Fresnel prism has a width that changes along the length of the first Fresnel prism.

29. The optical body of claim 25, wherein the Fresnel prisms are light transmissive and refractive.

30. The optical body of claim 25, wherein the Fresnel prisms are reflective.

31. The optical body of claim 25, wherein the structured surface provides a 3-dimensional appearance.

32. The optical body of claim 25, wherein the planarizing layer comprises a nanovoided material.

33. An optical body comprising a structured surface comprising a plurality of Fresnel prisms comprising a first Fresnel prism;
   wherein the Fresnel prisms are arranged in a slope sequence, the slope sequence defining one or more inflection points;
   wherein the first Fresnel prism has a first prism shape in plan view that includes an undulating portion; and
   wherein the structured surface is formed in a first material layer, and wherein the optical body further comprises an indicia layer attached directly or indirectly to the first material layer.

34. The optical body of claim 25, wherein the undulating portion of the first prism shape comprises an inflection point.

35. An optical body comprising a structured surface comprising a plurality of Fresnel prisms comprising a first Fresnel prism, the first Fresnel prism having a first prism shape in plan view that includes an inflection point, wherein the Fresnel prisms are arranged in a slope sequence in a cross sectional plane, the slope sequence defining one or more inflection points.

36. The optical body of claim 35, wherein the first prism shape undulates and includes a plurality of inflection points.

* * * * *

UNITED STATES PATENT AND TRADEMARK OFFICE
CERTIFICATE OF CORRECTION

PATENT NO. : 8,922,895 B1  
APPLICATION NO. : 13/935219  
DATED : December 30, 2014  
INVENTOR(S) : Weber It is certified that error appears in the above-identified patent and that said Letters Patent is hereby corrected as shown below:

In the specification,

Col. 10, line 28, delete "n- and" and insert -- z- and --.

Col. 12, line 32, delete "He" and insert -- Hc --.

Col. 12, line 37, delete "He" and insert -- Hc --.

Col. 20, line 34, delete "1P2." and insert -- IP2. --.

Col. 21, line 15, delete "1P2" and insert -- IP2 --.

Col. 21, line 35, delete "1P2." and insert -- IP2. --.

In the claims,

Col. 26, line 36, in Claim 10, change "limber" and insert -- further --.

Col. 26, line 58, in Claim 15, change "along," and insert -- along --.

Col. 26, line 60, in Claim 15, change "alone" and insert -- along --.

Col. 27, line 14, in Claim 22, delete "surface face." and insert -- surface. --.

Col. 27, line 37, in Claim 27, delete "along," and insert -- along --.

Signed and Sealed this  
First Day of March, 2016

Michelle K. Lee  
*Director of the United States Patent and Trademark Office*